United States Patent
Muruganathan et al.

(10) Patent No.: US 12,451,994 B2
(45) Date of Patent: Oct. 21, 2025

(54) METHOD FOR REPEATING A TRANSPORT BLOCK (TB) OVER MULTIPLE TRANSMISSION/RECEPTION POINTS (TRPs)

(71) Applicant: Telefonaktiebolaget LM Ericsson (publ), Stockholm (SE)

(72) Inventors: Siva Muruganathan, Stittsville (CA); Mattias Andersson, Sundbyberg (SE); Yufei Blankenship, Kildeer, IL (US); Sebastian Faxér, Stockholm (SE); Mattias Frenne, Uppsala (SE); Shiwei Gao, Nepean (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 551 days.

(21) Appl. No.: 17/608,711

(22) PCT Filed: May 1, 2020

(86) PCT No.: PCT/IB2020/054161
§ 371 (c)(1),
(2) Date: Nov. 3, 2021

(87) PCT Pub. No.: WO2020/225690
PCT Pub. Date: Nov. 12, 2020

(65) Prior Publication Data
US 2022/0216944 A1    Jul. 7, 2022

Related U.S. Application Data

(60) Provisional application No. 62/843,063, filed on May 3, 2019.

(51) Int. Cl.
*H04W 72/00* (2023.01)
*H04L 1/08* (2006.01)
*H04W 72/0446* (2023.01)

(52) U.S. Cl.
CPC ........... *H04L 1/08* (2013.01); *H04W 72/0446* (2013.01)

(58) Field of Classification Search
CPC . H04L 1/08; H04L 1/1819; H04L 2001/0092; H04L 5/0032; H04W 72/0446
See application file for complete search history.

(56) References Cited

U.S. PATENT DOCUMENTS 8,948,389 B2    2/2015  Lu
2011/0237283 A1  9/2011  Shan et al.
(Continued)

FOREIGN PATENT DOCUMENTS

CN    104618077 A    5/2015
CN    105453672 A    3/2016
(Continued)

OTHER PUBLICATIONS

Huawei (Reliability /robustness enhancement with multi-TRP/panel, R1-1903983, Apr. 2019).*
(Continued)

*Primary Examiner* — Lakeram Jangbahadur
(74) *Attorney, Agent, or Firm* — Withrow & Terranova, PLLC

(57) ABSTRACT

A method for repeating a Transport Block (TB) over multiple transmission occasions. The method includes exchanging specific signaling between a wireless device (e.g., a user equipment) and a network node (e.g., a base station) to repeat same or different redundancy versions of the TB in multiple non-overlapping transmission occasions (e.g., mini-slots) corresponding to multiple Transmission Configuration Indication (TCI) states and having different start positions. More specifically, the network node transmits a Time Domain Resource Allocation (TDRA) to indicate the multiple non-overlapping transmission occasions and the
(Continued)

---

Receive a Time Domain Resource Allocation, TDRA, from a network node, the TDRA indicting reception of a plurality of transmission occasions of same or different redundancy versions of a Transport Block, TB, in a plurality of non-overlapping transmission occasions corresponding to a plurality of Transmission Configuration Indication, TCI, states and having a plurality of different start positions, respectively
800

Receive the plurality of transmission occasions corresponding to the plurality of TCI states in the plurality of non-overlapping transmission occasions
802 wireless device receives the TDRA indicating the multiple non-overlapping transmission occasions. Accordingly, the wireless device can receive repetition of the TB according to the TDRA. By indicating transmission occasions in the TDRA, it is possible to efficiently schedule multiple transmission occasions over the multiple TCI states, thus helping to improve efficiency, reliability, and coverage in a wireless communications network.

26 Claims, 16 Drawing Sheets

(56) References Cited

U.S. PATENT DOCUMENTS

| | | | |
|---|---|---|---|
| 2012/0057545 | A1 | 3/2012 | Hariharan et al. |
| 2018/0324772 | A1 | 11/2018 | Babaei et al. |
| 2020/0351926 | A1* | 11/2020 | Bagheri ............... H04W 72/23 |
| 2021/0112583 | A1 | 4/2021 | Gao et al. |
| 2022/0007410 | A1* | 1/2022 | Cirik ................ H04W 72/1273 |
| 2022/0022245 | A1 | 1/2022 | Dudda et al. |
| 2022/0240187 | A1* | 7/2022 | Guo ................ H04W 52/0229 |

FOREIGN PATENT DOCUMENTS

| | | | | |
|---|---|---|---|---|
| EP | 3793250 A1 * | 3/2021 | ........... | H04L 1/0068 |
| KR | 100703730 B1 | 4/2007 | | |
| WO | 2019032882 A1 | 2/2019 | | |

OTHER PUBLICATIONS

ZTE (Enhancements on Multi-TRP and Multi-panel Transmission, R1-1904013, Apr. 2019).*

Huawei567 (Enhancements on Multi-TH.P/panel transmission, R1-1901567, Mar. 2019).*

Huawei, et al., "R1-1901567: Enhancements on Multi-TRP/panel transmission," 3GPP TSG RAN WG1 #96, Feb. 25-Mar. 1, 2019, Athens, Greece, 15 pages.

Nokia, et al., "R1-1903797: Summary of Friday offline discussion on potential enhancements for PUSCH for NR URLLC," 3GPP TSG-RAN WG1 Meeting #96, Feb. 25-Mar. 1, 2019, Athens, Greece, 40 pages.

Sharp, "R1-1902664: Views on potential enhancements to PUSCH for eURLLC," 3GPP TSG RAN WG1 #96, Feb. 25-Mar. 1, 2019, Athens, Greece, 11 pages.

ZTE, "R1-1904013: Enhancements on Multi-TRP and Multi-panel Transmission," 3GPP TSG RAN WG1 #96bis, Apr. 8-12, 2019, Xi'an, China, 14 pages.

Notice of Reasons for Refusal for Japanese Patent Application No. 2021-565126, mailed Jan. 5, 2023, 8 pages.

Author Unknown, "Technical Specification Group Radio Access Network; NR; Physical channels and modulation (Release 15)," Technical Specification 38.211, Version 15.5.0, 3GPP Organizational Partners, Mar. 2019, 96 pages.

Author Unknown, "Technical Specification Group Radio Access Network; NR; Multiplexing and channel coding (Release 15), " Technical Specification 38.212, Version 15.5.0, 3GPP Organizational Partners, Mar. 2019, 101 pages.

Author Unknown, "Technical Specification Group Radio Access Network; NR; Physical layer procedures for data (Release 15)," Technical Specification 38.214, Version 15.5.0, 3GPP Organizational Partners, Mar. 2019, 103 pages.

Author Unknown, "Technical Specification Group Radio Access Network; NR; Radio Resource Control (RRC) protocol specification (Release 15)," Technical Specification 38.331, Version 15.5.1, 3GPP Organizational Partners, Apr. 2019, 491 pages.

Huawei, et al., "R1-1903983: Reliability/robustness enhancement with multi-TRP/panel," Third Generation Partnership Project (3GPP), TSG RAN WG1 meeting #96b, Apr. 8-12, 2019, 10 pages, Xi'an, China.

International Search Report and Written Opinion for International Patent Application No. PCT/IB2020/054161, mailed Aug. 3, 2020, 13 pages.

First Office Action for Chinese Patent Application No. 202080048258.2, mailed Sep. 6, 2023, 11 pages.

Notice of Preliminary Rejection for Korean Patent Application No. 2021-7039041, mailed Jul. 13, 2023, 11 pages.

Huawei, et al., "R1-190ABCD: Summary of AI: 7.2.8.2 Enhancements on Multi-TRP/Panel Transmission of Offline Discussion," 3GPP TSG RAN WG1 Meeting #96bis, Apr. 8-12, 2019, Xi'an, China, 59 pages.

Examination Report for European Patent Application No. 20724588.7, mailed Apr. 13, 2023, 7 pages.

Office Action for Colombian Patent Application No. NC2021/0015717, mailed Oct. 1, 2024, 20 pages.

* cited by examiner

NR time-domain structure with 15kHz subcarrier spacing

*NR physical resource grid*

Front-loaded DM-RS for configuration type 1 and type 2. CDM groups indicated by color An example of a NR Rel-16 Enhancement for PDSCH where multiple PDSCHs corresponding to different TCI states are received from multi-TRPs An example of a NR Rel-16 slot-based time-multiplexed PDSCHs from two TRPs where each PDSCH is associated with a different TCI state.

An example of a NR Rel-16 mini-slot-based time-multiplexed PDSCHs from two TRPs where each PDSCH is associated with a different TCI state.

An example of different repetition length in the last repletion in a slot

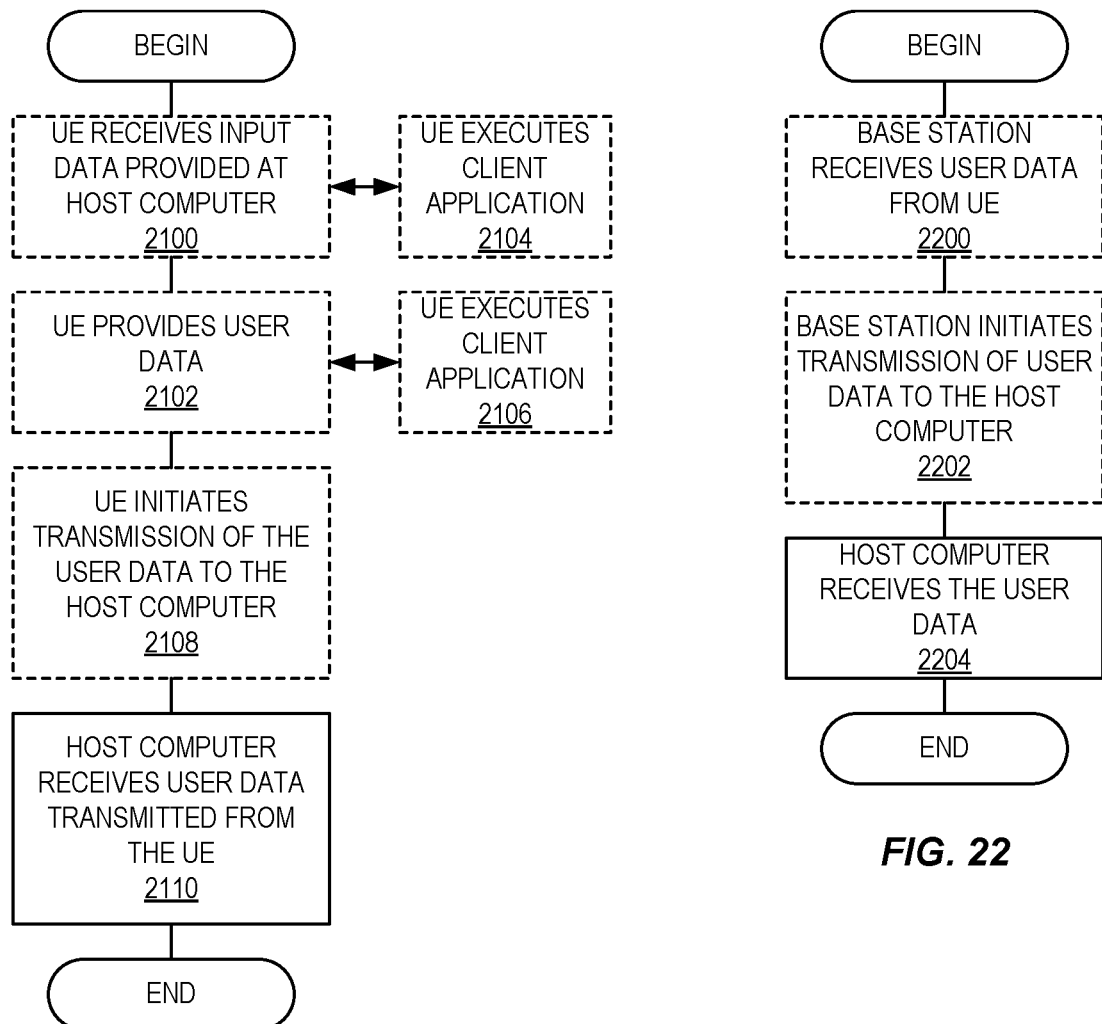

METHOD FOR REPEATING A TRANSPORT BLOCK (TB) OVER MULTIPLE TRANSMISSION/RECEPTION POINTS (TRPs)

RELATED APPLICATIONS

This application is a 35 U.S.C. § 371 national phase filing of International Application No. PCT/IB2020/054161, filed May 1, 2020, which claims the benefit of provisional patent application Ser. No. 62/843,063, filed May 3, 2019, the disclosures of which are hereby incorporated herein by reference in their entireties.

TECHNICAL FIELD

The technology of the disclosure relates generally to Time Domain Resource Allocation (TDRA) for repeating a Transport Block (TB) over multiple Transmission/Reception Points (TRPs).

BACKGROUND

The new Fifth-Generation (5G) mobile wireless communication system or New Radio (NR) supports a diverse set of use cases and a diverse set of deployment scenarios. NR uses Cyclic Prefix (CP)-Orthogonal Frequency Division Multiplexing (OFDM) (CP-OFDM) in the downlink (DL) (e.g., from a network node, gNB, eNB, or base station, to a User Equipment (UE)) and both CP-OFDM and Discrete Fourier Transform (DFT)-Spread-OFDM (DFT-S-OFDM) in the Uplink (UL) (e.g., from UE to gNB). In the time domain, NR downlink and uplink physical resources are organized into equally-sized subframes of 1 millisecond (ms) each. A subframe is further divided into multiple slots of equal duration.

The slot length depends on subcarrier spacing. For subcarrier spacing of $\Delta f=15$ kHz, there is only one slot per subframe and each slot always consists of 14 OFDM symbols, irrespectively of the subcarrier spacing.

Typical data scheduling in NR are provided on a per slot basis. An example is shown in FIG. 1 wherein the first two symbols contain Physical Downlink Control Channel (PDCCH) and the remaining 12 symbols contain Physical Data Channel (PDCH), which may be a Physical Downlink Shared Channel (PDSCH) or Physical Uplink Shared Channel (PUSCH).

Different subcarrier spacing values are supported in NR. The Supported Subcarrier Spacing (SCS) values (also referred to as different numerologies) are given by $\Delta f=(15 \times 2^{\alpha})$ kHz, wherein $\alpha \in (0, 1, 2, 4, 8)$. $\Delta f=15$ kHz is the basic subcarrier spacing that is also used in Long-Term Evolution (LTE), the corresponding slot duration is 1 ms. For a given SCS, the corresponding slot duration is $1/(2^{\alpha})$ ms.

In the frequency domain physical resource definition, a system bandwidth is divided into Resource Blocks (RBs), each corresponding to 12 contiguous subcarriers. The basic NR physical time-frequency resource grid is illustrated in FIG. 2, wherein only one RB within a 14-symbol slot is shown. One OFDM subcarrier during one OFDM symbol interval forms one Resource Element (RE).

Downlink transmissions can be dynamically scheduled. For example, in each slot the gNB transmits Downlink Control Information (DCI) over PDCCH to indicate which UE a UE data is transmitted to and which RBs and OFDM symbols in the current downlink slot the UE data is transmitted in. PDCCH is typically transmitted in the first one or two OFDM symbols in each slot in NR. The UE data are carried on PDSCH. A UE first detects and decodes PDCCH and, if the decoding is successful, the UE then decodes the corresponding PDSCH based on the decoded control information in the PDCCH.

Uplink data transmission can also be dynamically scheduled using PDCCH. Similar to downlink, a UE first decodes uplink grants in PDCCH and then transmits data over PUSCH based on the decoded control information in the uplink grant, such as modulation order, coding rate, uplink resource allocation, etc.

Radio Resource Control (RRC) Configuration of Number of Repetitions in Rel-15

In NR Rel-15, slot-aggregation is supported both for DL and UL transmissions, which is beneficial for enhancing the coverage and improved reliability. In this case, the PDSCH and PUSCH transmissions can be repeated in multiple slots when the RRC parameter for slot aggregation is configured. The corresponding RRC parameter is referred to as PDSCH-AggregationFactor, PUSCH-AggregationFactor, repK for PDSCH, grant based PUSCH, and grant-free PUSCH, respectively. The relevant Information Elements (IEs) from TS 38.331 are listed below to illustrate the usage of these parameters.

| PDSCH-Config information element |
|---|
| -- ASN1START |
| -- TAG-PDSCH-CONFIG-START |
| PDSCH-Config ::=                         SEQUENCE { |
| ... |
|   resourceAllocation                     ENUMERATED {resourceAllocationType0, resourceAllocationType1, dynamicSwitch}, |
|   pdsch-TimeDomainAllocationList         SetupRelease { PDSCH-TimeDomainResourceAllocationList }       OPTIONAL, -- Need M |
|   pdsch-AggregationFactor                ENUMERATED { n2, n4, n8 }  OPTIONAL, -- Need S |
| ... |
| } |

| PUSCH-Config information element |
| --- |
| PUSCH-Config ::=    SEQUENCE {
...
  resourceAllocation           ENUMERATED { resourceAllocationType0,
                               resourceAllocationType1, dynamicSwitch},
  pusch-TimeDomainAllocationList    SetupRelease { PUSCH-
                               TimeDomainResourceAllocationList }
                                   OPTIONAL, -- Need M
  pusch-AggregationFactor      ENUMERATED { n2, n4, n8 }
                                   OPTIONAL, --
                               OPTIONAL, -- Need S
Need S
...
} |

| ConfiguredGrantConfig information element |
| --- |
| ConfiguredGrantConfig ::=    SEQUENCE {
...
  repK                ENUMERATED {n1, n2, n4, n8},
...
} |

When a UE is scheduled by DL assignment or DL Semi-Persistent Scheduling (SPS) for PDSCH transmission in a given slot, the signaled resource allocation for the PDSCH is used for a number of consecutive slots if aggregation factor is configured with a value larger than 1. In this case, the PDSCH is repeated with different Redundancy Versions (RVs) in those slots scheduled for transmission of corresponding Transport Blocks (TBs). The same procedure is applied for UL, wherein a UE is scheduled by UL assignment or grant-free for PUSCH transmission in a slot and configured for slot aggregations. In this case the UE uses the signaled resource allocation in the number of slots given by the aggregation factors using different RVs for the transmission of corresponding TBs. The RV to be applied on the $n^{th}$ transmission occasion of the TB is determined according to table below, wherein $rv_{id}$ is the RV identity number.

TABLE 5.1.2.1-2

Applied redundancy version when
pdsch-AggregationFactor is present

| $rv_{id}$ indicated by the DCI scheduling the PDSCH | $rv_{id}$ to be applied to $n^{th}$ transmission occasion | | | |
| --- | --- | --- | --- | --- |
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

In NR Rel-16, proposals for indicating the number of repetitions in DCI are being discussed. Some proposals in NR Rel-16 include indicating the number of repetitions in a newly introduced DCI field. Some other proposals in NR Rel-16 include indicating the number of repetitions using an existing DCI field, such as Time Domain Resource Allocation (TDRA) field.

TDRA in NR Rel-15

In NR Rel-15, the TDRA information for a PDSCH transmission in a slot includes such information that the UE can use to determine a slot in which the PDSCH is expected to be received (also known as K0), a starting symbol in the slot for PDSCH reception, and a length or duration of PDSCH reception (a.k.a. Start and Length Indicator Value (SLIV)). The UE is also provided with a mapping type that can be used to determine a Demodulation Reference Signal (DMRS) position. In NR, TDRA tables are specified to include different combinations of K0, SLIV, etc. The UE can be signaled an index to a row in the TDRA table that provides information on K0 and SLIV to be used for reception.

The similar procedure is applied for PUSCH transmissions, wherein a slot intended for PUSCH transmission is obtained from a field in UL assignment (a.k.a. K2). The SLIV information is provided in a similar way as for the DL reception as well as the mapping type by the UL assignment and/or configuration.

The TDRA is a time domain resource allocation for a first instant of PDSCH reception or PUSCH transmissions. As mentioned previously, if the UE is configured with the aggregation factor, the transmission in one slot will be repeated in multiple slots based on the aggregation factor.

The relevant IEs from TS 38.331 are listed below to illustrate the usage of these parameters.

| PDSCH-TimeDomainResourceAllocationList information element |
| --- |
| -- ASN1START
-- TAG-PDSCH-TIMEDOMAINRESOURCEALLOCATIONLIST-START
PDSCH-TimeDomainResourceAllocationList ::= SEQUENCE (SIZE(1..maxNrofDL-
Allocations)) OF PDSCH-TimeDomainResourceAllocation
PDSCH-TimeDomainResourceAllocation ::= SEQUENCE {
  k0                       INTEGER(0..32)
      OPTIONAL, -- Need S
  mappingType              ENUMERATED {typeA, typeB},
  startSymbolAndLength     INTEGER (0..127)
} |

-continued

-- TAG-PDSCH-TIMEDOMAINRESOURCEALLOCATIONLIST-STOP
-- ASN1STOP

PDSCH-TimeDomainResourceAllocation field descriptions k0
The n1 corresponds to the value 1, n2 corresponds to value 2, and so on.
Corresponds to L1 parameter 'K0' (see 38.214, section 5.1.2.1) When the field is
absent the UE applies the value 0.
mappingType
PDSCH mapping type. (see 38.214, section 5.3)
startSymbolAndLength
An index giving valid combinations of start symbol and length (jointly encoded) as
start and length indicator (SLIV). The network configures the field so that the
allocation does not cross the slot boundary.
Corresponds to L1 parameter 'Index-start-len' (see 38.214, section 5.1.2.1)

PUSCH-TimeDomainResourceAllocation information element

-- ASN1START
-- TAG-PDSCH-TIMEDOMAINRESOURCEALLOCATIONLIST-START
PDSCH-TimeDomainResourceAllocationList ::= SEQUENCE
(SIZE(1..maxNrofDL-Allocations)) OF PDSCH-
TimeDomainResourceAllocation
PDSCH-TimeDomainResourceAllocation ::= SEQUENCE {
    k0                              INTEGER(0..32)     OPTIONAL,
    --
  Need S
    mappingType                     ENUMERATED {typeA, typeB},
    startSymbolAndLength            INTEGER (0..127)
}
-- TAG-PDSCH-TIMEDOMAINRESOURCEALLOCATIONLIST-STOP PUSCH-TimeDomainResourceAllocationList field descriptions k2
Corresponds to L1 parameter 'K2' (see 38.214, section 6.1.2.1) When the field is
absent the UE applies the value 1 when PUSCH SCS is 15/30 KHz; 2 when PUSCH
SCS is 60 KHz and 3 when PUSCH SCS is 120 KHz.
mappingType
Mapping type. Corresponds to L1 parameter 'Mapping-type' (see 38.214, section
6.1.2.1)
startSymbolAndLength
An index giving valid combinations of start symbol and length (jointly encoded) as
start and length indicator (SLIV). The network configures the field so that the
allocation does not cross the slot boundary. (see 38.214, section 6.1.2.1)

Quasi Co-Located (QCL) and Transmission Configuration Indication (TCI) States Several signals can be transmitted from the same base station antenna via different antenna ports. These signals can have the same large-scale properties, for instance, in terms of Doppler shift/spread, average delay spread, or average delay. These antenna ports are then said to be QCL.

The network can then signal to the UE that two antenna ports are QCL. If the UE knows that two antenna ports are QCL with respect to a certain parameter (e.g. Doppler spread), the UE can estimate that parameter based on one of the antenna ports and use that estimate when receiving the other antenna port. Typically, the first antenna port is represented by a measurement reference signal, such as Channel State Information (CSI)-Reference Signal (RS) (CSI-RS) (known as source RS), and the second antenna port is represented by a DMRS (known as target RS).

For instance, if antenna ports A and B are QCL with respect to average delay, the UE can estimate the average delay from the signal received from antenna port A (known as the source RS) and assume that the signal received from antenna port B (target RS) has the same average delay. This is useful for demodulation since the UE can know beforehand the properties of the channel when trying to measure the channel utilizing the DMRS.

Information about what assumptions can be made regarding QCL is signaled to the UE from the network. In NR, four types of QCL relations between a transmitted source RS and transmitted target RS were defined:

Type A: {Doppler shift, Doppler spread, average delay, delay spread}

Type B: {Doppler shift, Doppler spread}

Type C: {average delay, Doppler shift}

Type D: {Spatial Rx parameter}

QCL type D was introduced to facilitate beam management with analog beamforming and is known as spatial QCL. There is currently no strict definition of spatial QCL, but the understanding is that if two transmitted antenna ports are spatially QCL, the UE can use the same Rx beam to receive them. Note that for beam management, the discussion mostly revolves around QCL Type D, but it is also necessary to convey a Type A QCL relation for the RSs to the UE, so that it can estimate all the relevant large scale parameters.

Typically, this is achieved by configuring the UE with a CSI-RS for Tracking RS (TRS) for time/frequency offset estimation. To be able to use any QCL reference, the UE needs to receive the TRS with a sufficiently good Signal to Interference plus Noise Ratio (SINR). In many cases, this means that the TRS has to be transmitted in a suitable beam to a certain UE.

To introduce dynamics in beam and Transmission/Reception Point (TRP) selection, the UE can be configured through RRC signaling with N TCI states, wherein N is up to 128 in Frequency Range 2 (FR2) and up to 8 in Frequency Range 1 (FR1), depending on UE capability.

Each TCI state contains QCL information, for example one or two source DL RSs, each associated with a QCL type. For example, a TCI state contains a pair of CSI-RSs each associated with a QCL type, e.g., two different CSI-RSs {CSI-RS1, CSI-RS2} is configured in the TCI state as {qcl-Type1,qcl-Type2}={Type A, Type D}. It means the UE can derive Doppler shift, Doppler spread, average delay, and delay spread from CSI-RS1 and derive the Spatial Rx parameter (e.g., the RX beam to use) from CSI-RS2. In case type D (spatial information) is not applicable, such as in low or mid band operation, then a TCI state contains only a single source RS.

Each of the N TCI states in the list of TCI states can be interpreted as a list of N possible beams transmitted from the network or a list of N possible TRPs used by the network to communicate with the UE.

A first list of available TCI states is configured for PDSCH, and a second list for PDCCH contains pointers, known as TCI State IDs, to a subset of the TCI states configured for PDSCH. The network then activates one TCI state for PDCCH (e.g., provides a TCI for PDCCH) and up to M active TCI states for PDSCH. The number M of active TCI states the UE can support is a UE capability but the maximum in NR Rel-15 is 8.

Each configured TCI state contains parameters for the QCL associations between source RSs (CSI-RS or SS/PBCH ports) and target RSs (e.g., PDSCH/PDCCH DMRS ports). TCI states are also used to convey QCL information for the reception of CSI-RS.

If a UE is configured with 4 active TCI states (from a list of 64 total configured TCI states), then 60 TCI states out of the 64 TCI states will be inactive. As such, the UE does not need to be prepared to have large scale parameters estimated for those inactive TCI states. Instead, the UE continuously tracks and updates the large-scale parameters for the 4 active TCI states by measurements and analysis of the source RSs indicated by each TCI state.

In NR Rel-15, when scheduling a PDSCH to a UE, the DCI contains a pointer to one active TCI. The UE is then able to determine which large-scale parameter estimate to use when performing PDSCH DMRS channel estimation and thus PDSCH demodulation.

DMRS

DMRS is used for coherent demodulation of PDSCH (DL) and PUSCH (UL), as well as of PDCCH. The DMRS is confined in RBs carrying the associated physical layer channel and is mapped on allocated REs of the OFDM time-frequency grid such that the receiver can efficiently handle time/frequency-selective fading radio channels.

The mapping of DMRS to REs is configurable in both frequency and time domain, with two mapping types in the frequency domain (configuration type 1 or type 2) and two mapping types in the time domain (mapping type A or type B) defining the symbol position of the first DMRS within a transmission interval. The DMRS mapping in time domain can further be single-symbol based or double-symbol based, where the latter means that DMRS is mapped in two adjacent symbols. Furthermore, a UE can be configured with one, two, three, or four single-symbol DM-RS and one or two double-symbol DMRS. In scenarios with low Doppler, it may be sufficient to configure front-loaded DMRS only, for example one single-symbol DMRS or one double-symbol DM-RS, whereas in scenarios with high Doppler additional DMRS will be required.

FIG. 3 shows the mapping of front-loaded DMRS for configuration type 1 and type 2 with single-symbol and double-symbol DMRS and for the mapping type A with first DMRS in third symbol of a transmission interval of 14 symbols. It can be observed from FIG. 3 that type 1 and type 2 differ with respect to both the mapping structure and the number of supported DMRS Code Division Multiplexing (CDM) groups, wherein type 1 supports 2 CDM groups and Type 2 supports 3 CDM groups.

The mapping structure of type 1 is sometimes referred to as a 2-comb structure with two CDM groups defined, in frequency domain, by the set of subcarriers {0, 2, 4, . . . } and {1, 3, 5, . . . }. The comb mapping structure is a prerequisite for transmissions requiring low PAPR/CM and is thus used in conjunction with DFT-S-OFDM, whereas in CP-OFDM both type 1 and type 2 mapping are supported.

A DMRS antenna port is mapped to the resource elements within one CDM group only. For single-symbol DMRS, two antenna ports can be mapped to each CDM group whereas for double-symbol DM-RS four antenna ports can be mapped to each CDM group. Hence, the maximum number of DMRS ports is for type 1 either four or eight and for type 2 it is either six or twelve. An Orthogonal Cover Code (OCC) of length 2 ([+1,+1],[+1,−1]) is used to separate antenna ports mapped on same resource elements within a CDM group. The OCC is applied in frequency domain as well as in time domain when double-symbol DMRS is configured.

In NR Rel-15, the mapping of a PDSCH DMRS sequence r(m), m=0, 1, . . . on antenna port p_j and subcarrier k in OFDM symbol l for the numerology index μ is specified in TS 38.211 as:

$$a_{k,l}^{(p_j,\mu)} = \beta_{DMRS}^{PDSCH} r_\lambda^{(p_j)}(2n + k')$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

wherein $$r_\lambda^{(p_j)}(2n+k) = w_f(k')w_t(l')r(2n+k')$$

represents the reference signal mapped on port $p_j$ in CDM group λ after applying OCC in frequency domain, $w_f(k')$, and time domain, $w_t(l')$. Table 2 and Table 3 below show the PDSCH DMRS mapping parameters for configuration type 1 and type 2, respectively.

TABLE 1

PDSCH DMRS mapping parameters for configuration type 1.

| p | CDM group λ | Δ | $w_f(k')$ | | $w_t(l')$ | |
|---|---|---|---|---|---|---|
| | | | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 2

PDSCH DMRS mapping parameters for configuration type 2.

| p | CDM group λ | Δ | (k') | | $w_t(l')$ | |
|---|---|---|---|---|---|---|
| | | | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

QCL Relation to DMRS CDM Groups

In NR specification TS 38.211, there is a restriction stating that "the UE may assume that the PDSCH DMRS within the same CDM group are quasi co-located with respect to Doppler shift, Doppler spread, average delay, delay spread, and spatial Rx."

In cases where a UE is not scheduled for all DMRS ports within a CDM group, there may be another UE simultaneously scheduled, using the remaining ports of that CDM group. The UE can then estimate the channel for that other UE (thus an interfering signal) in order to perform coherent interference suppression. Hence, this is useful in Multi-User-Multiple Input Multiple Output (MU-MIMO) scheduling and UE interference suppression.

Ultra-Reliable and Low Latency Communication (URLLC) NR

In NR Rel.16, there are ongoing specification enhancements for URLLC with packet error rates down to $10^{-5}$. For these services, an alternative Modulation and Coding Scheme (MCS) table can be configured to be used for PDSCH or PUSCH scheduling, which gives more robust reception of the data payload.

NR Rel-16 Enhancements for PDSCH with Multi-TRPs

In NR Rel-16, there are ongoing discussions on the support of PDSCH with multi-TRP. One mechanism that is being considered in NR Rel-16 is a single PDCCH scheduling one or multiple PDSCH from different TRPs. The single PDCCH is received from one of the TRPs. FIG. 4 shows an example where a DCI received by the UE in PDCCH from TRP1 schedules two PDSCHs. The first PDSCH (PDSCH1) is received from TRP1 and the second PDSCH (PDSCH2) is received from TRP2. Alternatively, the single PDCCH schedules a single PDSCH where PDSCH layers are grouped into two groups and where layer group 1 is received from TRP1 and layer group 2 is received from TRP2. In such cases, each PDSCH or layer group is transmitted from a different TRP has a different TCI state associated with it. In the example of FIG. 4, PDSCH1 is associated with TCI State p, and PDSCH 2 is associated with TCI state q.

In the RANI. AdHoc meeting in January 2019, it has been agreed that TCI indication framework shall be enhanced in Rel-16 at least for eMBB:

Each TCI code point in a DCI can correspond to 1 or 2 TCI states
When 2 TCI states are activated within a TCI code point, each TCI state corresponds to one CDM group, at least for DMRS type 1
FFS design for DMRS type 2
FFS: TCI field in DCI, and associated MAC-CE signaling impact According to the above agreement, each code point in the DCI TCI field can be mapped to either 1 or 2 TCI states. This can be interpreted as "A DCI in PDCCH schedules 1 or 2 PDSCHs (or 1 or 2 layer groups if a single PDSCH) where each PDSCH or layer group is associated with a different TCI state; the code point of the TCI field in DCI indicates 1 or 2 TCI states associated with the 1 or 2 PDSCHs or layer groups scheduled." In this case, the two DMRS of the two PDSCHs or the two layer groups are not mapped to the same DMRS CDM group.

It should be noted that in FR2 operation, a single PDCCH that is received by a UE using one TCI state with QCL type D (for example, single PDCCH received using one received beam) may indicate one or more PDSCHs associated with another TCI state with QCL type D (for example, one of the PDSCHs received using another received beam). In this case, the UE needs to switch beams from the point of receiving the last symbol of the single PDCCH to the point of receiving the first symbol of the PDSCH. Such beam switching delays are counted in terms of number of OFDM symbols. For example, at 60 kHz subcarrier spacing, the beam switching delay can be 7 symbols; at 120 kHz subcarrier spacing, the beam switching delay can be 14 symbols.

For multi-TRP based PDSCH transmission, different schemes are being considered in NR Rel-16.

One of the schemes that is already agreed involves slot-based time multiplexing the different PDSCHs transmitted from multiple TRPs. An example is shown in FIG. 5. In this example, a PDCCH indicates two different PDSCHs where PDSCH 1 associated with TCI state p is transmitted from TRP 1 and PDSCH 2 associated with TCI state q is transmitted from TRP2. Since PDSCHs 1 and 2 are time multiplexed in different slots, the DMRS corresponding to the two PDSCHs are transmitted in non-overlapping resources (e.g., different slots). Hence, the DMRSs for the two PDSCHs can use the same or different CDM group or even exactly the same antenna ports in each of the slots. In the example of FIG. 5, DMRS for PDSCH 1 is transmitted using CDM group 0 in slot n, while DMRS for PDSCH 2 is transmitted using CDM group 0 in slot n+1. In NR Rel-16, the scheme of slot-based time-multiplexed PDSCHs associated with different TCI states is useful for URLLC.

Another scheme that has been agreed involves mini-slot-based time multiplexing (also known as PDSCH Type B scheduling in NR specifications) the different PDSCHs transmitted from multiple TRPs. An example is shown in FIG. 6. In this example, a PDCCH indicates two different PDSCHs where PDSCH 1 associated with TCI state p is transmitted from TRP 1 and PDSCH 2 associated with TCI state q is transmitted from TRP2. Since PDSCHs 1 and 2 are time multiplexed in different mini-slots, the DM-RS corresponding to the two PDSCHs are transmitted in non-overlapping resources (e.g., different mini-slots). Hence, the DMRSs for the two PDSCHs can use the same or different CDM group or even the same antenna ports in each mini-slot. In the example of FIG. 6, DMRS for PDSCH 1 is transmitted using CDM group 0 in mini-slot n, while DM-RS for PDSCH 2 is transmitted using CDM group 0 in mini-slot n+1. In NR Rel-16, the scheme of mini-slot-based time-multiplexed PDSCHs associated with different TCI states is being considered for URLLC.

Note that the PDSCHs transmitted from the two TRPs in the slot-based and mini-slot based time multiplexing schemes in FIG. 5 and FIG. 6 may correspond to the same or different RVs of the same TB (e.g., repetitions). Hence, the UE can do soft combining of the two PDSCHs transmitted from the two TRPs to achieve more reliable reception. Even though the examples in FIG. 5 and FIG. 6 show two repetitions over two TRPs, the slot-based and mini-slot based time multiplexing schemes are also applicable to cases with N>2 repetitions over M>1 TRPs.

SUMMARY

Embodiments disclosed herein include a method for repeating a Transport Block (TB) over multiple transmission occasions. The method includes exchanging specific signaling between a wireless device (e.g., a User Equipment (UE)) and a network node (e.g., a base station) to repeat same or different redundancy versions of the TB in multiple non-overlapping transmission occasions (e.g., mini-slots) corresponding to multiple Transmission Configuration Indication (TCI) states and having different start positions. More specifically, the network node transmits a Time Domain Resource Allocation (TDRA) to indicate the multiple non-overlapping transmission occasions and the wireless device receives the TDRA indicating the multiple non-overlapping transmission occasions. Accordingly, the wireless device can receive repetition of the TB according to the TDRA. By indicating the transmission occasions in the TDRA, it is possible to efficiently schedule multiple transmission occasions over the multiple TCI states, thus helping to improve efficiency, reliability, and coverage in a wireless communications network.

In one embodiment, a method performed by a wireless device for repeating a TB over multiple transmission occasions is provided. The method includes receiving a TDRA from a network node, the TDRA indicating reception of a plurality of transmission occasions of a same or different redundancy versions of a TB in a plurality of non-overlapping transmission occasions corresponding to a plurality of TCI states and having a plurality of different start positions, respectively. The method also includes receiving the plurality of transmission occasions corresponding to the plurality of TCI states in the plurality of non-overlapping transmission occasions.

In another embodiment, each of the plurality of non-overlapping transmission occasions corresponds to a different length or duration.

In another embodiment, each of the plurality of non-overlapping transmission occasions corresponds to an identical length or duration.

In another embodiment, the method further comprises receiving the TDRA from the network node in a TDRA field of a Downlink Control Information, DCI, message.

In another embodiment, the method further comprises receiving a TCI field in the DCI message, the TCI field indicating the plurality of TCI states.

In another embodiment, a number of the plurality of transmission occasions is explicitly indicated via the TDRA received in the TDRA field.

In another embodiment, the number of the plurality of transmission occasions and the TDRA for each of the plurality of transmission occasions are jointly encoded and are indicated by a codepoint of the TDRA field in the DCI message.

In another embodiment, the TDRA corresponds to a start symbol and a length defined by a parameter 'startSymbolAndLength'.

In another embodiment, the plurality of TCI states indicated in the TCI field are cycled through the indicated number of the plurality of transmission occasions, wherein a transmission occasion among the plurality of transmission occasions is associated to a TCI state among the plurality of TCI states according to an order of plurality of TCI states indicated in the TCI field.

In another embodiment, a first TCI state indicated in the TCI field among the plurality of TCI states is associated to a first transmission occasion among the plurality of transmission occasions.

In another embodiment, when a single TCI state is indicated in the TCI field, the single TCI state is associated to all the indicated number of the plurality of transmission occasions.

In another embodiment, a number of the plurality of transmission occasions is indicated via a number of the plurality of TCI states indicated in the TCI field.

In another embodiment, the plurality of TCI states indicated in the TCI field comprises a first TCI state and a second TCI state.

In another embodiment, an even numbered transmission occasion among the plurality of transmission occasions is associated with the first indicated TCI state and an odd numbered transmission occasion among the plurality of transmission occasions is associated with the second indicated TCI state.

In another embodiment, only a start symbol and a length of the odd numbered transmission occasion among the plurality of transmission occasions are indicated in the TDRA indicated by a codepoint of the TDRA field in the DCI message.

In another embodiment, a start symbol of the even numbered transmission occasion among the plurality of transmission occasions is determined with respect to a last symbol of an immediately preceding odd numbered transmission occasion among the plurality of transmission occasions.

In another embodiment, a start symbol of the even numbered transmission occasion among the plurality of transmission occasions is determined by adding one (1) to a last symbol of the immediately preceding odd numbered transmission occasion among the plurality of transmission occasions.

In another embodiment, the length of the even numbered transmission occasion is defined by the length of the odd numbered transmission occasion.

In another embodiment, a 'PDSCH Type B' indicated via the TDRA field in DCI message is applied to the odd numbered transmission occasion and the even numbered transmission occasion among the plurality of transmission occasions.

In another embodiment, the indicated plurality of TCI states correspond to a plurality of Transmission/Reception points (TRPs).

In another embodiment, the method further comprises receiving the TDRA from the network node for transmission of a plurality of uplink transmission occasions of a same or different redundancy versions of an uplink TB from the wireless device to the plurality of TRPs.

In another embodiment, the method further comprising one or more of: providing user data; and forwarding the user data to a host computer via a transmission to a base station.

A wireless device comprising: one or more transmitters; one or more receivers; and processing circuitry associated with the one or more transmitters and the one or more receivers, the processing circuitry configured to cause the wireless device to: receive a Time Domain Resource Allocation, TDRA, from a network node, the TDRA indicating reception of a plurality of transmission occasions of a same or different redundancy versions of the TB in a plurality of non-overlapping transmission occasions corresponding to a plurality of Transmission Configuration Indication, TCI, states and having a plurality of different start positions, respectively; and receive the plurality of transmission occasions corresponding to the plurality of TCI states in the plurality of non-overlapping transmission occasions.

In another embodiment, the processing circuitry is further configured to cause the wireless device to perform the method performed by the wireless device.

In another embodiment, a method performed by a base station for transmitting a TB over multiple transmission occasions is provided. The method includes transmitting a TDRA to a wireless device. The TDRA indicating transmission of a plurality of transmission occasions of a same or different redundancy versions of a TB in a plurality of non-overlapping transmission occasions corresponding to a plurality of TCI states and having a plurality of different start positions, respectively. The method also includes transmitting the plurality of transmission occasions corresponding to the plurality of TCI states in the plurality of non-overlapping transmission occasions.

In another embodiment, each of the plurality of non-overlapping transmission occasions corresponds to a different length or duration.

In another embodiment, each of the plurality of non-overlapping transmission occasions corresponds to an identical length or duration.

In another embodiment, the method further comprises transmitting the TDRA to the wireless device in a TDRA field of a DCI message.

In another embodiment, the method further comprises transmitting a TCI field in the DCI message, the TCI field indicating the plurality of TCI states.

In another embodiment, a number of the plurality of transmission occasions is explicitly indicated via the TDRA transmitted in the TDRA field.

In another embodiment, the number of the plurality of transmission occasions and the TDRA for each of the plurality of transmission occasions are jointly encoded and are indicated by a codepoint of the TDRA field in the DCI message.

In another embodiment, the TDRA corresponds to a start symbol and a length defined by a parameter 'startSymbolAndLength'.

In another embodiment, the plurality of TCI states indicated in the TCI field are cycled through the indicated number of the plurality of transmission occasions, wherein a transmission occasion among the plurality of transmission occasions is associated to a TCI state among the plurality of TCI states according to an order of plurality of TCI states indicated in the TCI field.

In another embodiment, a first TCI state indicated in the TCI field among the plurality of TCI states is associated to a first transmission occasion among the plurality of transmission occasions.

In another embodiment, when a single TCI state is indicated in the TCI field, the single TCI state is associated to all the indicated number of the plurality of transmission occasions.

In another embodiment, a number of the plurality of transmission occasions is indicated via a number of the plurality of TCI states indicated in the TCI field.

In another embodiment, the plurality of TCI states indicated in the TCI field comprises a first TCI state and a second TCI state.

In another embodiment, an even numbered transmission occasion among the plurality of transmission occasions is associated with the first indicated TCI state and an odd numbered transmission occasion among the plurality of transmission occasions is associated with the second indicated TCI state.

In another embodiment, only a start symbol and a length of the odd numbered transmission occasion among the plurality of transmission occasions are indicated in the TDRA indicated by a codepoint of the TDRA field in the DCI message.

In another embodiment, a start symbol of the even numbered transmission occasion among the plurality of transmission occasions is determined with respect to a last symbol of an immediately preceding odd numbered transmission occasion among the plurality of transmission occasions.

In another embodiment, a start symbol of the even numbered transmission occasion among the plurality of transmission occasions is determined by adding one (1) to a last symbol of the immediately preceding odd numbered transmission occasion among the plurality of transmission occasions.

In another embodiment, the length of the even numbered transmission occasion is defined by the length of the odd numbered transmission occasion.

In another embodiment, a 'PDSCH Type B' indicated via the TDRA field in DCI message is applied to the odd numbered transmission occasion and the even numbered transmission occasion among the plurality of transmission occasions.

In another embodiment, the indicated plurality of TCI states corresponds to a plurality of TRPs.

In another embodiment, the method further comprises transmitting the TDRA to the wireless device for transmission of a plurality of uplink transmission occasions of a same or different redundancy versions of an uplink TB from the wireless device to the plurality of TRPs.

In another embodiment, A base station comprising: a radio unit configured to transmit a TDRA to a wireless device, the TDRA indicating transmission of a plurality of transmission occasions of a same or different redundancy versions of a TB in a plurality of non-overlapping transmission occasions corresponding to a plurality of TCI states and having a plurality of different start positions, respectively; and a control system configured to transmit the plurality of transmission occasions corresponding to the plurality of TCI states in the plurality of non-overlapping transmission occasions.

In another embodiment, the base station is further configured to perform the method performed by the based station.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 21 is a flowchart illustrating a method implemented in a communication system in accordance with one embodiment of the present disclosure; and FIG. 22 is a flowchart illustrating a method implemented in a communication system in accordance with one embodiment of the present disclosure.

DETAILED DESCRIPTION

Figure 1:
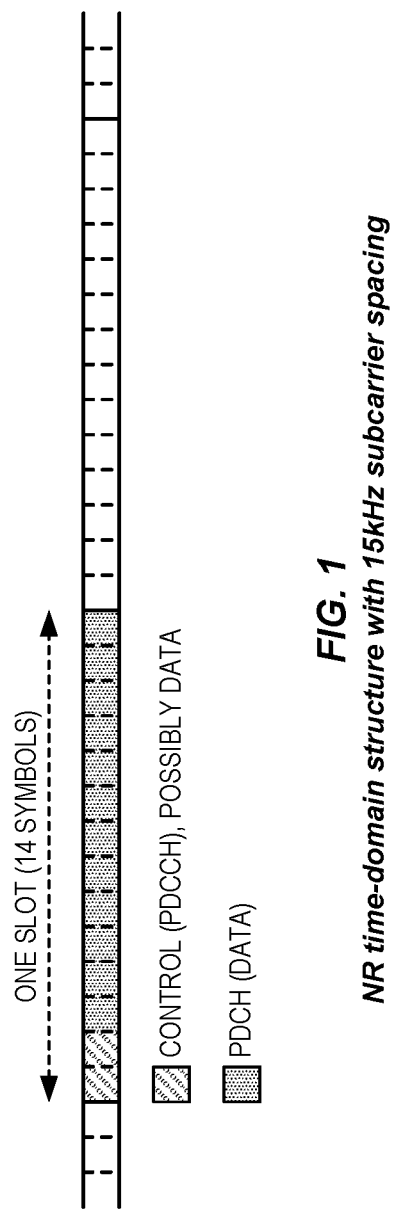
FIG. 1 illustrates an example of New Radio (NR) time-domain structure with 15 kHz subcarrier spacing.
Figure 2:
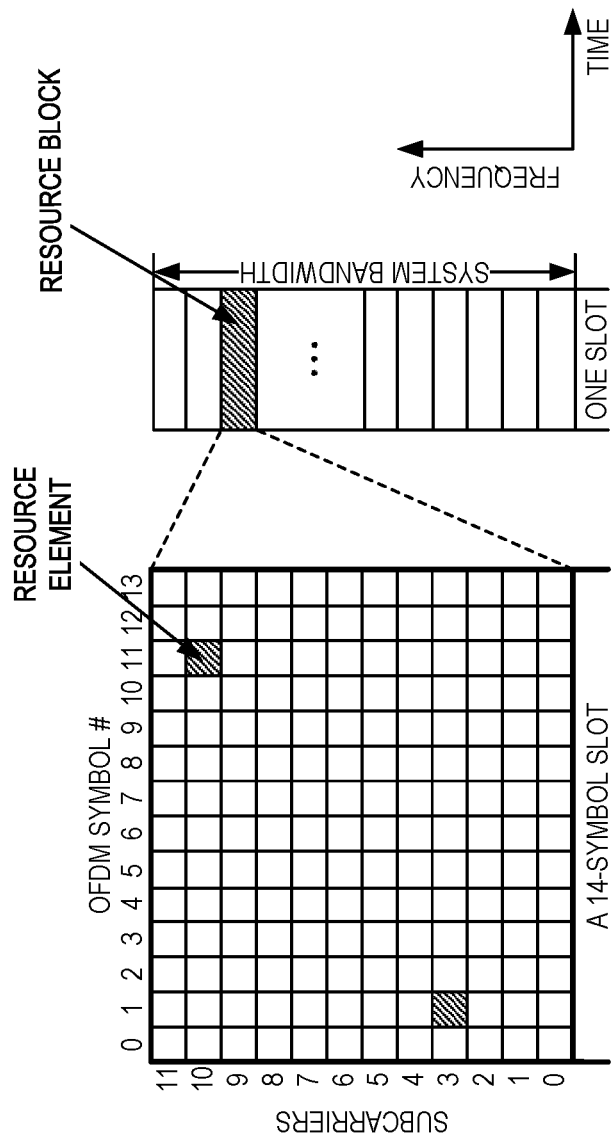
FIG. 2 illustrates an example of an NR physical resource grid.
Figure 3:
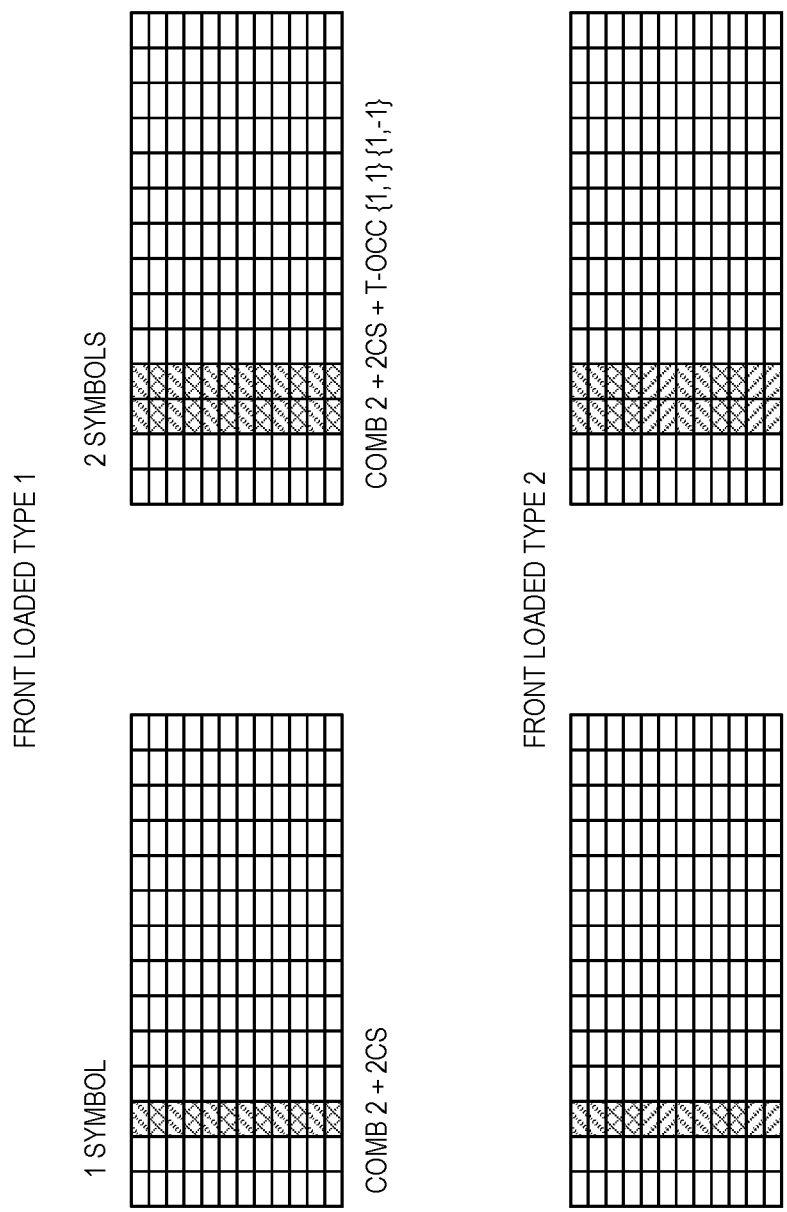
FIG. 3 illustrates a mapping of front-loaded Demodulation Reference Signal (DMRS) configuration type 1 and type 2.
Figure 4:
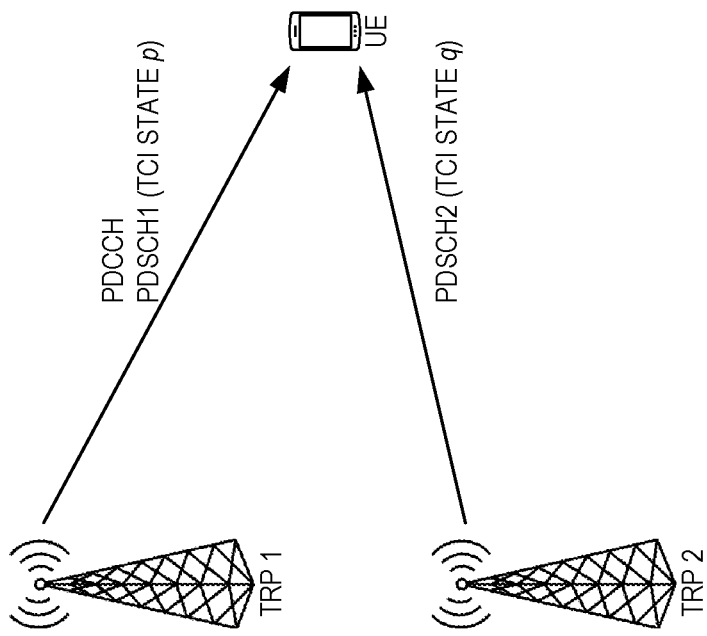
FIG. 4 illustrates an example of an NR enhancement for Physical Downlink Shared Channel (PDSCH) wherein multiple PDSCHs corresponding to different Transmission Configuration Indication (TCI) states are received from multiple Transmission/Reception Points (TRPs)
Figure 5:
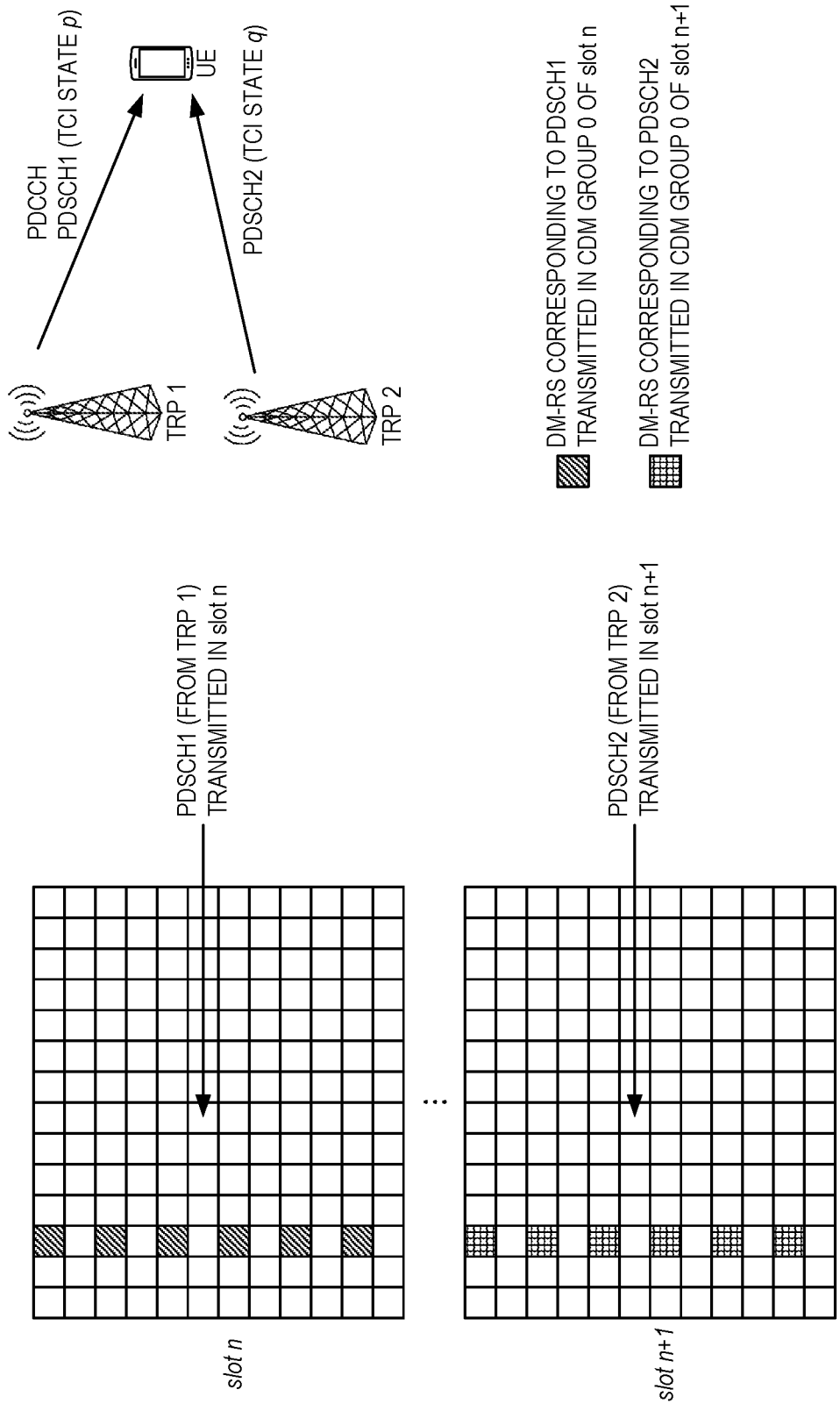
FIG. 5 illustrates an example of slot-based time multiplexed PDSCHs from two TRPs.
Figure 6:
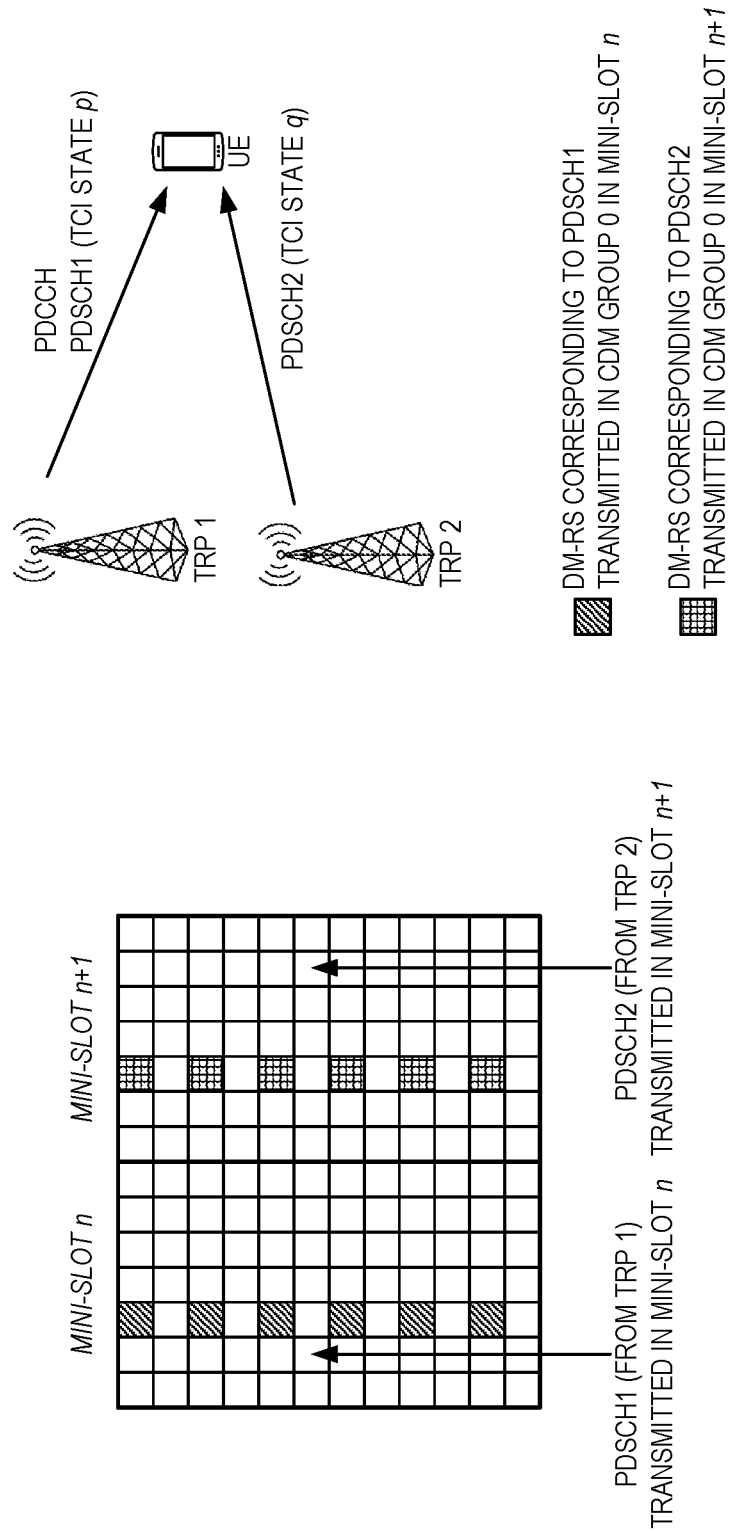
FIG. 6 illustrates an example of mini-slot-based time multiplexed PDSCHs from two TRPs.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 7:
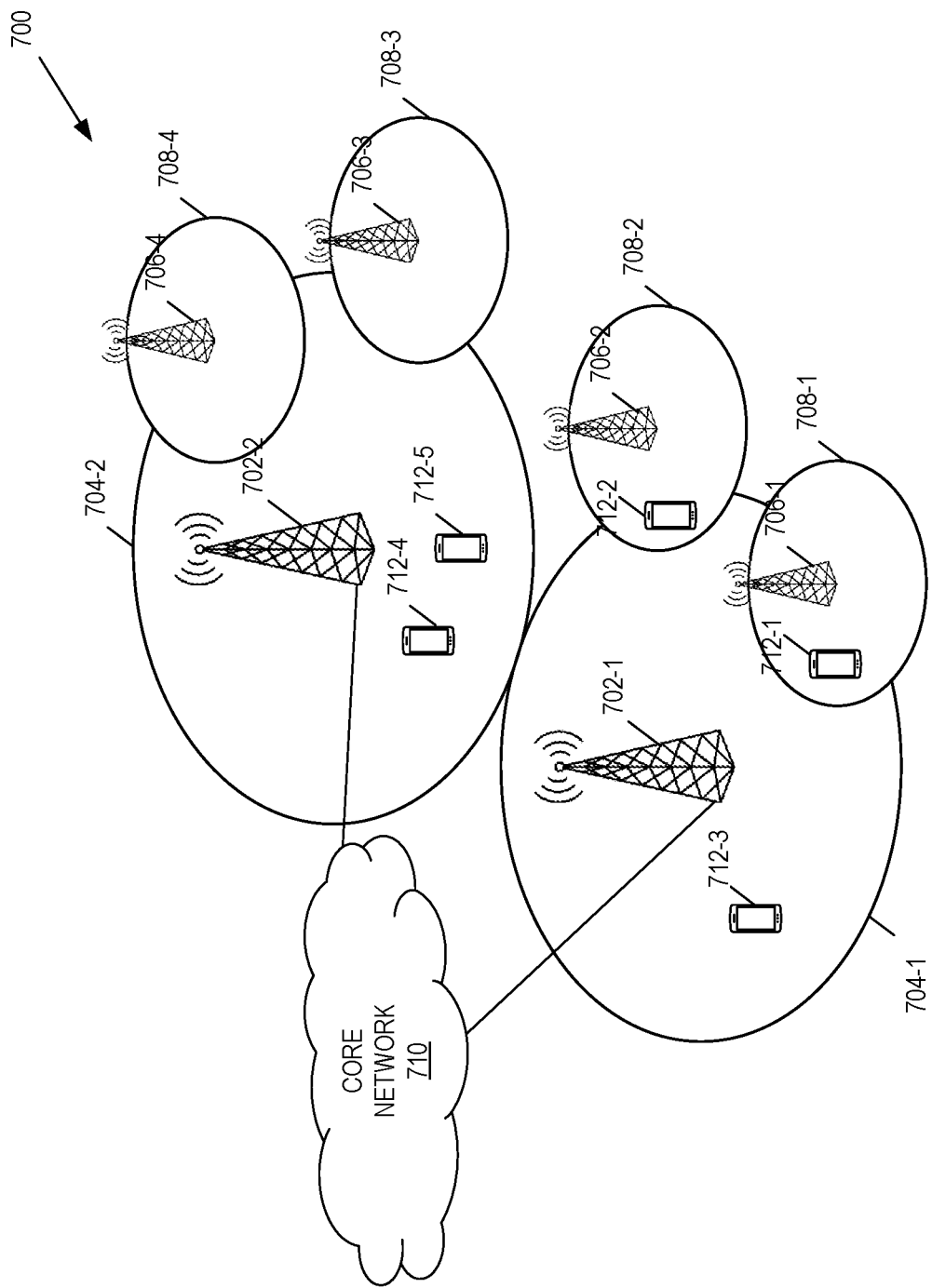
FIG. 7 illustrates one example of a cellular communications network in which embodiments of the present disclosure may be implemented.

FIG. 7 illustrates one example of a cellular communications network 700 in which embodiments of the present disclosure may be implemented. In the embodiments described herein, the cellular communications network 700 is a 5G NR network. In this example, the cellular communications network 700 includes base stations 702-1 and 702-2, which in 5G NR are referred to as gNBs, controlling corresponding macro cells 704-1 and 704-2. The base stations 702-1 and 702-2 are generally referred to herein collectively as base stations 702 and individually as base station 702. Likewise, the macro cells 704-1 and 704-2 are generally referred to herein collectively as macro cells 704 and individually as macro cell 704. The cellular communications network 700 may also include a number of low power nodes 706-1 through 706-4 controlling corresponding small cells 708-1 through 708-4. The low power nodes 706-1 through 706-4 can be small base stations (such as pico or femto base stations) or Remote Radio Heads (RRHs), or the like. Notably, while not illustrated, one or more of the small cells 708-1 through 708-4 may alternatively be provided by the base stations 702. The low power nodes 706-1 through 706-4 are generally referred to herein collectively as low power nodes 706 and individually as low power node 706. Likewise, the small cells 708-1 through 708-4 are generally referred to herein collectively as small cells 708 and individually as small cell 708. The base stations 702 (and optionally the low power nodes 706) are connected to a core network 710.

The base stations 702 and the low power nodes 706 provide service to wireless devices 712-1 through 712-5 in the corresponding cells 704 and 708. The wireless devices 712-1 through 712-5 are generally referred to herein collectively as wireless devices 712 and individually as wireless device 712. The wireless devices 712 are also sometimes referred to herein as UEs.

There currently exist certain challenge(s). Even though the slot-based and mini-slot based time multiplexing schemes are agreed in 3GPP for multi-Transmission/Reception Point (TRP), the signaling details for Time Domain Resource Allocation (TDRA) is still an open problem. One additional open problem is how to associate a particular Physical Downlink Shared Channel (PDSCH) transmission from a TRP to a particular repetition that may be Radio Resource Control (RRC) configured or indicated dynamically via Downlink Control Information (DCI).

Certain aspects of the present disclosure and their embodiments may provide solutions to the aforementioned or other challenges. Aspects discussed herein provide a way of signaling multiple non-overlapping time domain resource allocations to a User Equipment (UE) that is configured to receive slot-based or mini-slot based time multiplexing based repetition transmitted through multiple TRPs. Examples for indicating the start symbol and lengths of each repetition are also provided.

Figure 8:
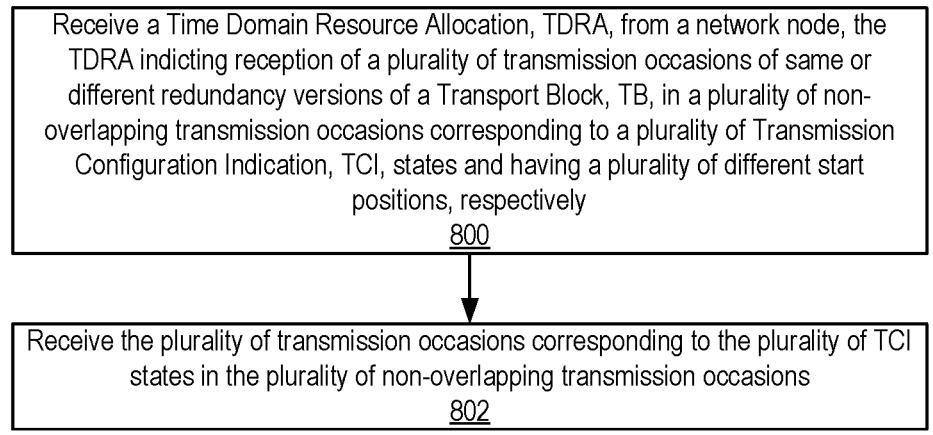
FIG. 8 is a flowchart that illustrates the operation of a wireless device (e.g., a UE) configured according to some embodiments of the present disclosure to improve non-overlapping Time Domain Resource Allocation (TDRA) signalling in multi-TRP operation.

There are, proposed herein, various embodiments that address one or more of the issues disclosed herein. Before describing some example embodiments in detail, FIG. 8 is a flowchart that illustrates the operation of a wireless device (e.g., a UE) configured according to some embodiments of the present disclosure to improve non-overlapping TDRA signalling (e.g., as defined in NR Rel. 15 and/or Rel. 16) in multi-TRP operation. The wireless device may be configured to receive a TDRA (e.g., in a DCI message) from a network node, the TDRA indicates reception of a plurality of transmission occasions of same or different redundancy versions of a TB in a plurality of non-overlapping transmission occasions (e.g., multiple mini-slots) corresponding to a plurality of TCI states, respectively, wherein each of the transmission occasions corresponds to a different start position (e.g., start symbol) (block 800). The wireless device may also be configured to receive the multiple transmission occasions corresponding to the plurality of TCI states in the non-overlapping repetition occasions based on the scheduling (block 802).

Figure 9:
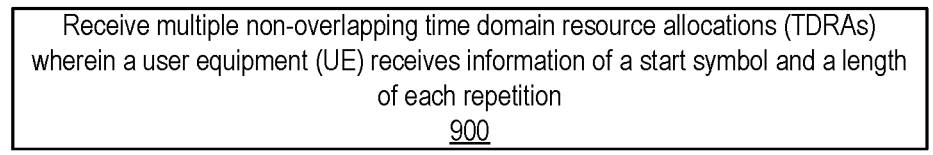
FIG. 9 is a flowchart that illustrates the operation of a UE to receive an indication of multiple PDSCH scheduling by a single downlink control information (DCI) message.

FIG. 9 is a flowchart that illustrates the operation of a UE to receiving an indication of multiple PDSCH scheduling (repetitions) by a single DCI message. The UE may be configured to receive multiple non-overlapping TDRAs wherein the UE receives information of a start symbol and a length of each repetition (block 900).

Figure 10:
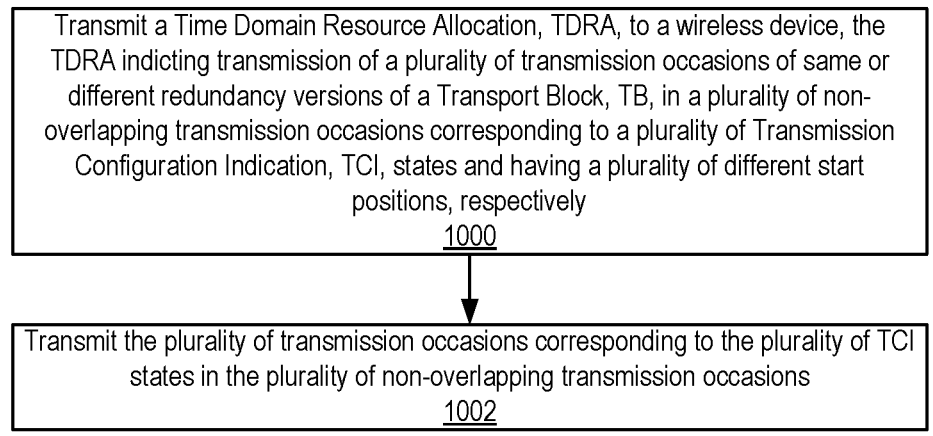
FIG. 10 is a flowchart that illustrates the operation of a base station to improve non-overlapping TDRA signalling in a multi-TRP operation.

FIG. 10 is a flowchart that illustrates the operation of base station to improve non-overlapping TDRA signalling (e.g., as defined in NR Rel. 15 and/or Rel. 16) in multi-TRP operation. The base station may be configured to transmit a TDRA (e.g., in a DCI message) to a wireless device (e.g., a UE), the TDRA indicates repetition of a plurality of transmission occasions of same or different redundancy versions of a TB in a plurality of non-overlapping transmission occasions (e.g., multiple mini-slots) corresponding to a plurality of TCI states, respectively, wherein each of the plurality of transmission occasions corresponds to a different start position (e.g., start symbol) (block 1000). The base station may also be configured to transmit the plurality of transmission occasions corresponding to the plurality of TCI states in the non-overlapping transmission occasions (block 1002).

Certain embodiments may provide one or more of the following technical advantage(s). The method disclosed herein provides efficient means for signaling non-overlapping TDRA to a UE such that the UE can receive slot-based or mini-slot based time multiplexed repetition transmitted through multiple TRPs.

TDRA for Downlink (DL) Multi-TRP Operation

The NR Rel-15 mechanism for TDRA using the PDSCH-TimeDomainResourceAllocationList information element may be unsuitable for multi-TRP operation since each PDSCH-TimeDomainResourceAllocation in the TimeDomainResourceAllocationList only provides one startSymbolAndLength index. In multi-TRP operation with mini-slot based time multiplexing (mini-slot is equivalent to PDSCH Type B scheduling), the start symbol of the mini-slot corresponding to different TRPs must be different. To generalize, the length of each mini-slot may also be different to give the flexibility. For example, if only six symbols are available in two mini-slots, then one four-symbol and one two-symbol mini-slot can be scheduled.

A key aspect of the disclosure is that the TDRA contains scheduling of multiple mini-slots, where each mini-slot may have different start positions and may also have different time duration/length.

In one embodiment, the TDRA field in the DCI may contain a joint encoding of the TDRA for scheduling multiple mini-slots, for example multiple PDSCH Type B scheduling. For example, a relation between the end symbol of the nth repetition can be used to define the start symbol for the (n+1)th repetition and this relation can be used to reduce the number of bits needed for TDRA of multi-slot scheduling. For example, with back to back scheduling, the nth repetition ends in symbol q, then the (n+1)th repetition starts in symbols q+1. With this compression, it is only needed to indicate the start of the first repetition, the total length across all repetitions, and the number of (equal duration) repetitions.

In another embodiment, the starting point of the first repetition is signaled, as well as individual lengths for each repetition. As above, the (n+1)th repetition starts at the first In one variant of this embodiment, the startSymbolAndLength indices (e.g., the size of the list) are set equal to the number of repetitions X. The value of X may be either RRC configured or X is indicated by DCI, for example using an information element or "field" in the DCI (the DCI field can be a dedicated field of nX bits in DCI for indicating the number of repetitions or an existing field in DCI format 1-1 can be reused for this purpose).

In one variant of this embodiment, a number of repetitions X are jointly encoded with the time-domain resource allocations for each repetition. That is, a codepoint of the TDRA field in DCI indicates both the number of repetitions X and the startSymbolAndLength corresponding to each repetition. This can be achieved by utilizing the following ASN.1 structure to define the interpretation of the TDRA field:

```
PDSCH-TimeDomainResourceAllocationList-Rep ::= SEQUENCE
   (SIZE(1..maxNrofDL-Allocations)) OF PDSCH-
   TimeDomainResourceAllocation-Rep
PDSCH-TimeDomainResourceAllocation-Rep:: = SEQUENCE {
      nrofRepetitions                                        INTEGER(1...maxNRofRepetitions),
   timeDomainResourceAllocationForEachRep SEQUENCE
   (SIZE(1..nrofRepetitions)) OF PDSCH-TimeDomainResourceAllocation
}
PDSCH-TimeDomainResourceAllocation::= SEQUENCE {
   mappingType                                               ENUMERATED {typeA, typeB},
   k0                                                        INTEGER(0..32)
      OPTIONAL, -- Need S
startSymbolAndLength                                         INTEGER (0..127)
}
``` symbol after the nth repetition, assuming back to back scheduling. In one version of this embodiment, a row in the TDRA table contains at least a starting symbol for the first repetition, and N different lengths, where N is the number of repetitions. In some versions of this embodiment, the number of repetitions is determined by the number of lengths signaled.

In some embodiments, the number of repetitions is signaled as one column in the TDRA table.

Figure 11:
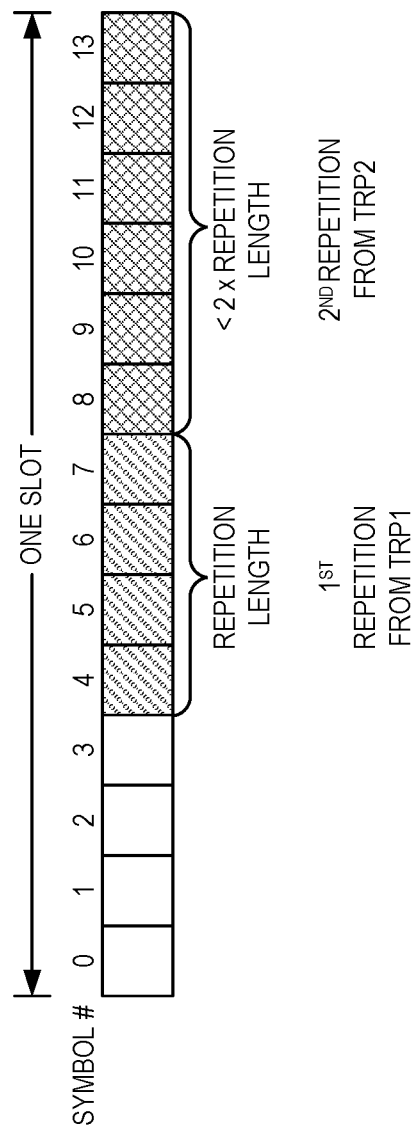
FIG. 11 illustrates an example of a different repetition length in a last repetition of a slot.

In an alternative embodiment, the length of one repetition is indicated and the total length is the product of the number of repetitions and the number of OFDM symbols per repetition. In yet another embodiment, only the start symbol and length of the first repetition are signaled. The repetition continues until the last OFDM symbol of the same slot in which the first repetition starts. The repetitions cycle through all TCI states (note one TCI state can correspond to one TRP) indicated in the TCI field of the DCI. The number of repetitions may not be signaled. For example, if two TCI states (corresponding to TRP1 and TRP2) are indicated, then the even numbered repetitions are transmitted from TRP1 and odd numbered repetitions are transmitted from TRP2. The last repetition may have a different length than the other repetitions, depending on the available OFDM symbols between the starting symbol and the last symbol in the slot. An example is shown in FIG. 11, in which the starting symbol #4 with a repetition length of 4 symbols and two TCI states (corresponding to two TRPs) are signaled. The 1st repetition is transmitted from TRP1 and for the 2nd repetition, since the remaining 6 symbols are less than 2 times the signaled repetition length, all the 6 symbols are used for the second repetition from TRP2.

In one embodiment, a number of startSymbolAndLength indices (for example, a list of startSymbolAndLength indices) are included in each PDSCH-TimeDomainResourceAllocation.

In some cases, if the TCI field in DCI indicates a single TRP (e.g., one TCI state indicated in the DCI field or alternatively, if multiple states are indicated, the indicated TCI states have the same value, for example use the same entry in the list of configured TCI states), then the multiple number of startSymbolAndLength indices applies to the different PDSCH repetitions transmitted from the single TRP. In this case, the UE may assume the same TCI state holds for the PDSCH transmitted in all the scheduled repetitions. In a further embodiment, when this case applies, the UE is allowed to interpolate the channel measured from the DMRS in each of the mini-slots for all the scheduled PDSCH repetitions. Stated differently, the UE may assume that a DMRS antenna port in each of the mini-slots is valid as the same DMRS port for all mini-slot of the PDSCH repetitions, to allow channel interpolation which improves channel estimation performance. Another interpretation is that the validity region in time dimension of a DMRS antenna port used for a scheduled repetition of a PDSCH is across all scheduled repetitions of the DMRS.

In an alternative case, if the TCI field in DCI indicates a single TRP (e.g., one TCI state indicated in the DCI field or alternatively, if multiple states are indicated, the indicated TCI states have the same value, for example use the same entry in the list of configured TCI states), then the first index of the startSymbolAndLength indices applies to the different PDSCH repetitions transmitted from the single TRP. The embodiment related to channel interpolation from the previous paragraph can also be applied to this alternative case.

In the case that the TCI field in DCI indicates M>1 TRPs (e.g., M different TCI states indicated in the DCI field) and the number of repetitions indicated is N>2. Then, in some variants of this embodiment, the first ceil(N/M) startSymbolAndLength indices in the list correspond to different PDSCH repetitions transmitted from the first TRP associated with the first TCI state indicated in the DCI field. The next ceil(N/M), or the remaining N-ceil(N/M) startSymbolAnd- Length indices in the list correspond to different PDSCH repetitions transmitted from the second TRP associated with the second TCI state indicated in the DCI field.

Alternatively, the startSymbolAndLength indices in the list sequentially correspond to PDSCH transmissions from different TRPs. That is, the nth startSymbolAndLength index in the list corresponds to PDSCH transmission associated with TCI state mod(n,M).

In another embodiment, the start symbol and lengths are defined in different TDRA tables for multiple and single TRP operation. For single TRP operation, each row of the TDRA table consists of a single start symbol and a single length. For multi TRP operation, each row of the TDRA table may consist of a multiple start symbol and one or more lengths. In the multiple TRP case, at least the number of start symbols may equal the number of TRPs. As to which time domain resource allocation table is used, it may depend on the number of TCI states indicated in the TCI field in DCI. That is, if the TCI field in DCI indicates a single TCI state, then a first TDRA table for single TRP operation is used. If the TCI field in DCI indicates multiple TCI states, then a second TDRA table for multiple TRP operation is used.

Time Resources in Two Different Slots for Two Different TRPs

In another embodiment, the time domain resources of two different TRPs may reside in two different slots. Thus, in addition to startSymbolAndLength, parameter k0 need to be signaled also for each TRP. One example to signal the TDRA is illustrated below, assuming two TRPs.

```
PDSCH-TimeDomainResourceAllocationList-MultiTRP ::= SEQUENCE
(SIZE(1..maxNrofDL-Allocations)) OF PDSCH-
TimeDomainResourceAllocation-MultiTRP
PDSCH-TimeDomainResourceAllocation-MultiTRP ::= SEQUENCE {
    mappingType             ENUMERATED {typeA, typeB},
    k0-TRP1                 INTEGER(0..32)
        OPTIONAL, -- Need S
    startSymbolAndLength-TRP1   INTEGER (0..127)
    k0-TRP2                 INTEGER(0..32)
    OPTIONAL, -- Need S
    startSymbolAndLength-TRP1   INTEGER (0..127)
}
```

In another embodiment, since the slot used by TRP2 is expected to be identical to, or within the next few slots, k0-TRP2 can be signaled as a delta k0 instead, to reduce the number of bits needed. For example, the signaling may be updated to:

PDSCH-TimeDomainResourceAllocationList-Multi-TRP:=SEQUENCE
(SIZE(1 . . . maxNrofDL-Allocations)) OF PDSCH-TimeDomainResourceAllocation-MultiTRP

```
PDSCH-TimeDomainResourceAllocation-MultiTRP ::= SEQUENCE {
    mappingType             ENUMERATED {typeA,
typeB},
    k0-TRP1                 INTEGER(0..32)
    OPTIONAL, -- Need S
    startSymbolAndLength-TRP1   INTEGER (0..127)
    delta-k0-TRP2           INTEGER(0..4)
        OPTIONAL, -- Need S
    startSymbolAndLength-TRP1   INTEGER (0..127)
}
```

With the above, the value k0 for TRP2 is then obtained as (k0-TRP1+delta-k0-TRP2).

In the above, it was assumed that both TRP use the same mappingType. In general, two TRPs may use different mappingType, which requires that mappingType be signaled for each TRP separately.

In the above, for simplicity, it was assumed that scheduling was across two TRPs. In general, more than two TRP may be used to transmit a TB on the DL. The same methods and principles can be easily extended to apply to more-than-two TRPs.

TDRA for Uplink (UL) Multi-TRP Operation

Similar to DL data transmission, the embodiments described herein can be applied to enhance TDRA signaling for Physical Uplink Shared Channel (PUSCH) when multi-TRP operation is used.

For example, the embodiment can be modified to the following when applied to PUSCH scheduling. Thus, the value k2 for TRP2 is then obtained as (k2-TRP1+delta-k2-TRP2).

```
PUSCH-TimeDomainResourceAllocationList-MultiTRP ::= SEQUENCE
(SIZE(1..maxNrofUL-Allocations)) OF PUSCH-
TimeDomainResourceAllocation-MultiTRP
PUSCH-TimeDomainResourceAllocation ::= SEQUENCE {
    MappingType             ENUMERATED {typeA, typeB},
    k2-TRP1                 INTEGER(0..32) OPTIONAL, --
Need S
    startSymbolAndLength-TRP1   INTEGER (0..127)
    delta-k2-TRP2           INTEGER(0..32) OPTIONAL, --
Need S
    startSymbolAndLength-TRP2   INTEGER (0..127)
}
```

Additional Aspects

Figure 12:
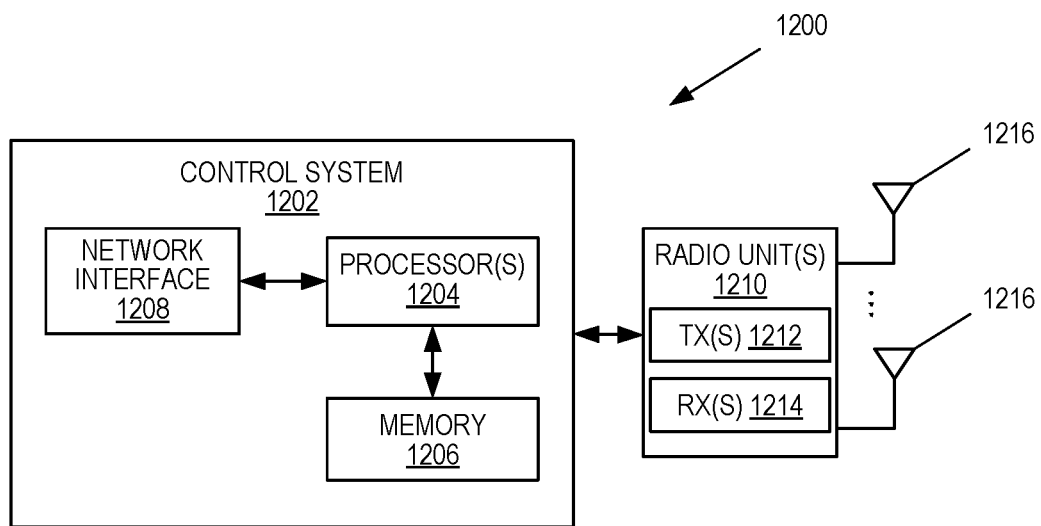
FIG. 12 is a schematic block diagram of a radio access node according to some embodiments of the present disclosure.

FIG. 12 is a schematic block diagram of a radio access node 1200 according to some embodiments of the present disclosure. The radio access node 1200 may be, for example, a base station 702 or 706. As illustrated, the radio access node 1200 includes a control system 1202 that includes one or more processors 1204 (e.g., Central Processing Units (CPUs), Application Specific Integrated Circuits (ASICs), Field Programmable Gate Arrays (FPGAs), and/or the like), memory 1206, and a network interface 1208. The one or more processors 1204 are also referred to herein as processing circuitry. In addition, the radio access node 1200 includes one or more radio units 1210 that each includes one or more transmitters 1212 and one or more receivers 1214 coupled to one or more antennas 1216. The radio units 1210 may be referred to or be part of radio interface circuitry. In some embodiments, the radio unit(s) 1210 is external to the control system 1202 and connected to the control system 1202 via, e.g., a wired connection (e.g., an optical cable). However, in some other embodiments, the radio unit(s) 1210 and potentially the antenna(s) 1216 are integrated together with the control system 1202. The one or more processors 1204 operate to provide one or more functions of a radio access node 1200 as described herein. In some embodiments, the function(s) is implemented in software that is stored, e.g., in the memory 1206 and executed by the one or more processors 1204.

Figure 13:
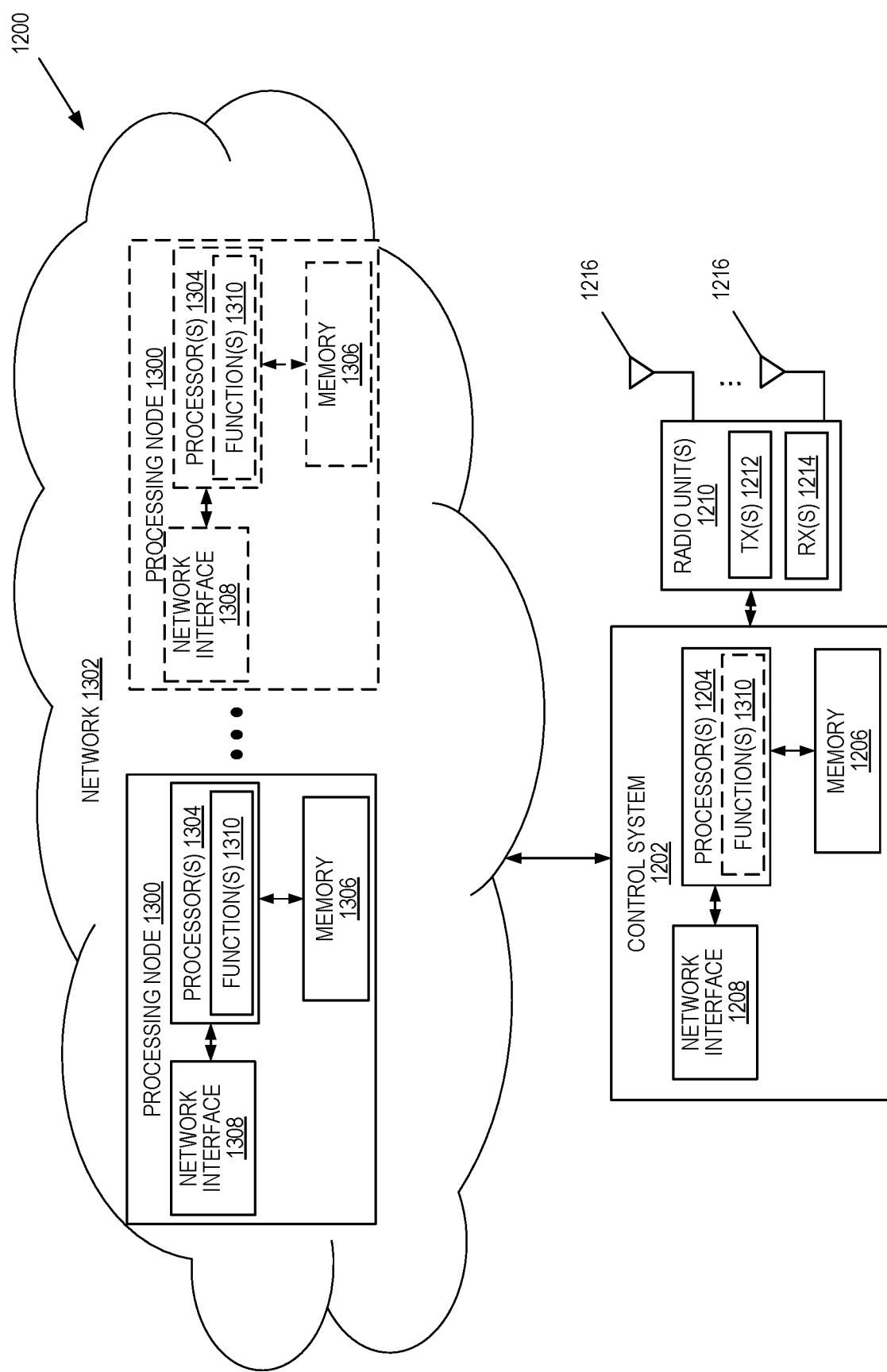
FIG. 13 is a schematic block diagram that illustrates a virtualized embodiment of the radio access node according to some embodiments of the present disclosure.

FIG. 13 is a schematic block diagram that illustrates a virtualized embodiment of the radio access node 1200 according to some embodiments of the present disclosure. This discussion is equally applicable to other types of network nodes. Further, other types of network nodes may have similar virtualized architectures.

As used herein, a "virtualized" radio access node is an implementation of the radio access node 1200 in which at least a portion of the functionality of the radio access node 1200 is implemented as a virtual component(s) (e.g., via a virtual machine(s) executing on a physical processing node (s) in a network(s)). As illustrated, in this example, the radio access node 1200 includes the control system 1202 that includes the one or more processors 1204 (e.g., CPUs, ASICs, FPGAs, and/or the like), the memory 1206, and the network interface 1208 and the one or more radio units 1210 that each includes the one or more transmitters 1212 and the one or more receivers 1214 coupled to the one or more antennas 1216, as described above. The control system 1202 is connected to the radio unit(s) 1210 via, for example, an optical cable or the like. The control system 1202 is connected to one or more processing nodes 1300 coupled to or included as part of a network(s) 1302 via the network interface 1208. Each processing node 1300 includes one or more processors 1304 (e.g., CPUs, ASICs, FPGAs, and/or the like), memory 1306, and a network interface 1308.

In this example, functions 1310 of the radio access node 1200 described herein are implemented at the one or more processing nodes 1300 or distributed across the control system 1202 and the one or more processing nodes 1300 in any desired manner. In some particular embodiments, some or all of the functions 1310 of the radio access node 1200 described herein are implemented as virtual components executed by one or more virtual machines implemented in a virtual environment(s) hosted by the processing node(s) 1300. As will be appreciated by one of ordinary skill in the art, additional signaling or communication between the processing node(s) 1300 and the control system 1202 is used in order to carry out at least some of the desired functions 1310. Notably, in some embodiments, the control system 1202 may not be included, in which case the radio unit(s) 1210 communicates directly with the processing node(s) 1300 via an appropriate network interface(s).

In some embodiments, a computer program including instructions which, when executed by at least one processor, causes the at least one processor to carry out the functionality of the radio access node 1200 or a node (e.g., a processing node 1300) implementing one or more of the functions 1310 of the radio access node 1200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
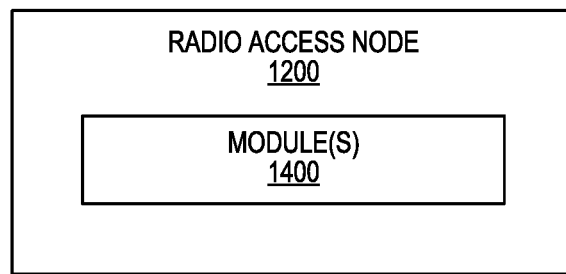
FIG. 14 is a schematic block diagram of the radio access node according to some other embodiments of the present disclosure.

FIG. 14 is a schematic block diagram of the radio access node 1200 according to some other embodiments of the present disclosure. The radio access node 1200 includes one or more modules 1400, each of which is implemented in software. The module(s) 1400 provides the functionality of the radio access node 1200 described herein. This discussion is equally applicable to the processing node 1300 of FIG. 13 where the modules 1400 may be implemented at one of the processing nodes 1300 or distributed across multiple processing nodes 1300 and/or distributed across the processing node(s) 1300 and the control system 1202.

Figure 15:
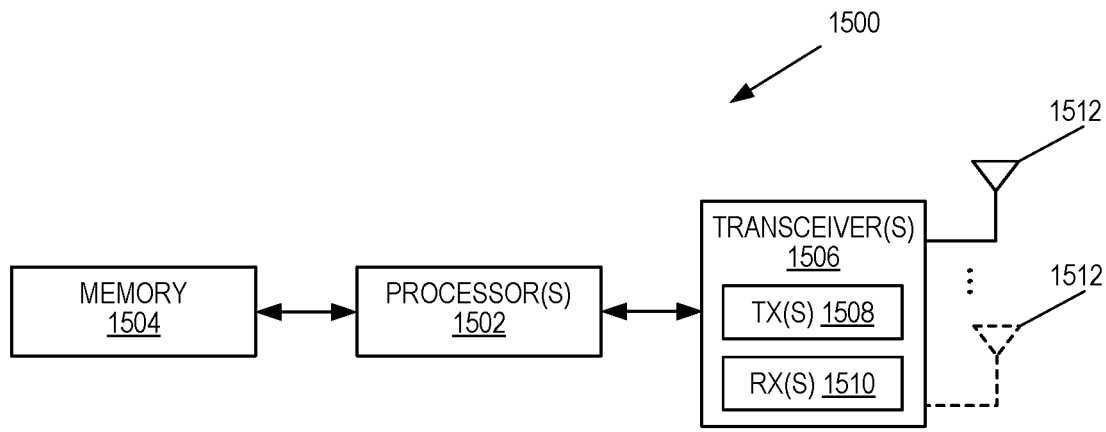
FIG. 15 is a schematic block diagram of a UE according to some embodiments of the present disclosure.

FIG. 15 is a schematic block diagram of a UE 1500 according to some embodiments of the present disclosure. As illustrated, the UE 1500 includes one or more processors 1502 (e.g., CPUs, ASICs, FPGAs, and/or the like), memory 1504, and one or more transceivers 1506 each including one or more transmitters 1508 and one or more receivers 1510 coupled to one or more antennas 1512. The transceiver(s) 1506 includes radio-front end circuitry connected to the antenna(s) 1512 that is configured to condition signals communicated between the antenna(s) 1512 and the processor(s) 1502, as will be appreciated by one of ordinary skill in the art. The processors 1502 are also referred to herein as processing circuitry. The transceivers 1506 are also referred to herein as radio circuitry. In some embodiments, the functionality of the UE 1500 described above may be fully or partially implemented in software that is, e.g., stored in the memory 1504 and executed by the processor(s) 1502. Note that the UE 1500 may include additional components not illustrated in FIG. 15 such as, e.g., one or more user interface components (e.g., an input/output interface including a display, buttons, a touch screen, a microphone, a speaker(s), and/or the like and/or any other components for allowing input of information into the UE 1500 and/or allowing output of information from the UE 1500), a power supply (e.g., a battery and associated power circuitry), etc.

In some embodiments, a computer program including instructions which, when executed by at least one processor, causes the at least one processor to carry out the functionality of the UE 1500 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
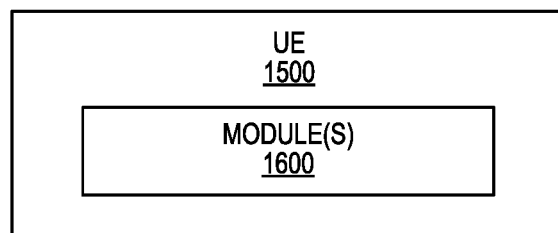
FIG. 16 is a schematic block diagram of the UE according to some other embodiments of the present disclosure.

FIG. 16 is a schematic block diagram of the UE 1500 according to some other embodiments of the present disclosure. The UE 1500 includes one or more modules 1600, each of which is implemented in software. The module(s) 1600 provides the functionality of the UE 1500 described herein.

Figure 17:
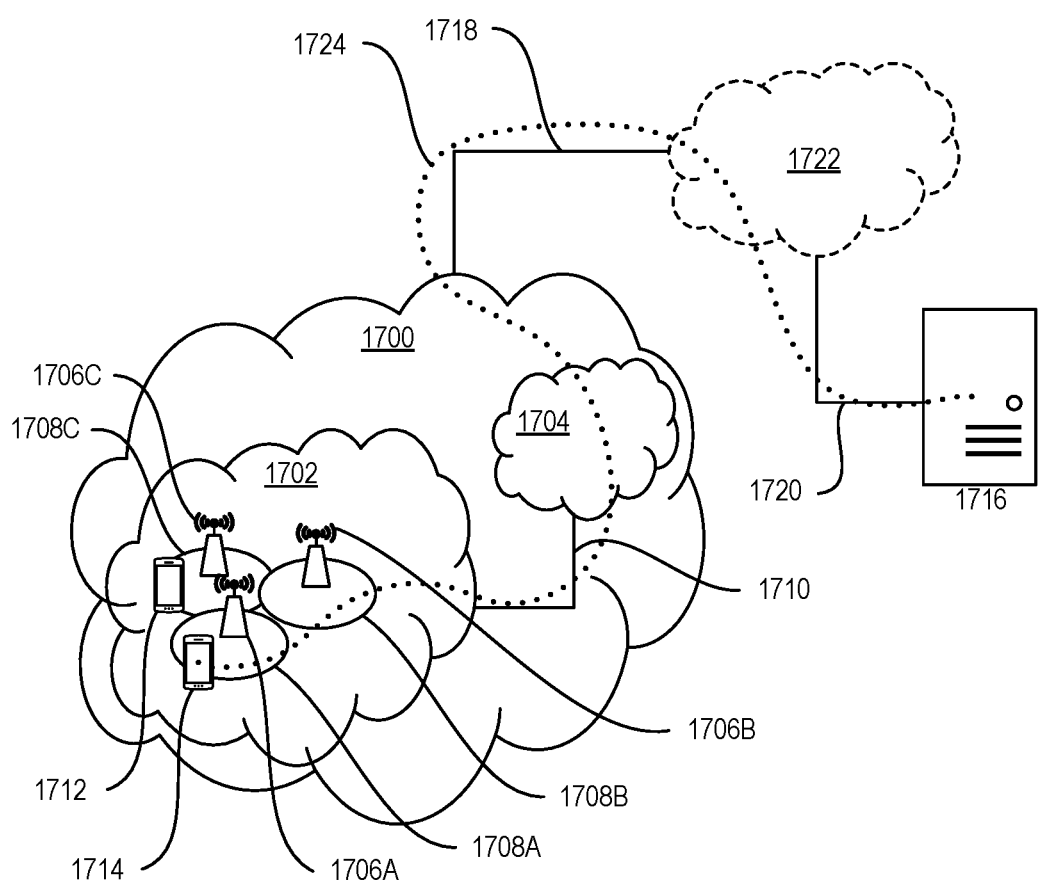
FIG. 17 is a schematic block diagram of a communication system including a telecommunication network, such as a Third Generation Partnership Project (3GPP)-type cellular network, which comprises an access network, such as a Radio Access Network (RAN), and a core network.

With reference to FIG. 17, in accordance with an embodiment, a communication system includes a telecommunication network 1700, such as a 3GPP-type cellular network, which comprises an access network 1702, such as a RAN, and a core network 1704. The access network 1702 comprises a plurality of base stations 1706A, 1706B, 1706C, such as NBs, eNBs, gNBs, or other types of wireless Access Points (APs), each defining a corresponding coverage area 1708A, 1708B, 1708C. Each base station 1706A, 1706B, 1706C is connectable to the core network 1704 over a wired or wireless connection 1710. A first UE 1712 located in coverage area 1708C is configured to wirelessly connect to, or be paged by, the corresponding base station 1706C. A second UE 1714 in coverage area 1708A is wirelessly connectable to the corresponding base station 1706A. While a plurality of UEs 1712, 1714 are illustrated in this example, the disclosed embodiments are equally applicable to a situation where a sole UE is in the coverage area or where a sole UE is connecting to the corresponding base station 1706.

The telecommunication network 1700 is itself connected to a host computer 1716, which may be embodied in the hardware and/or software of a standalone server, a cloud-implemented server, a distributed server, or as processing resources in a server farm. The host computer 1716 may be under the ownership or control of a service provider, or may be operated by the service provider or on behalf of the service provider. Connections 1718 and 1720 between the telecommunication network 1700 and the host computer 1716 may extend directly from the core network 1704 to the host computer 1716 or may go via an optional intermediate network 1722. The intermediate network 1722 may be one of, or a combination of more than one of, a public, private, or hosted network; the intermediate network 1722, if any, may be a backbone network or the Internet; in particular, the intermediate network 1722 may comprise two or more sub-networks (not shown).

The communication system of FIG. 17 as a whole enables connectivity between the connected UEs 1712, 1714 and the host computer 1716. The connectivity may be described as an Over-the-Top (OTT) connection 1724. The host computer 1716 and the connected UEs 1712, 1714 are configured to communicate data and/or signaling via the OTT connection 1724, using the access network 1702, the core network 1704, any intermediate network 1722, and possible further infrastructure (not shown) as intermediaries. The OTT connection 1724 may be transparent in the sense that the participating communication devices through which the OTT connection 1724 passes are unaware of routing of uplink and downlink communications. For example, the base station 1706 may not or need not be informed about the past routing of an incoming downlink communication with data originating from the host computer 1716 to be forwarded (e.g., handed over) to a connected UE 1712. Similarly, the base station 1706 need not be aware of the future routing of an outgoing uplink communication originating from the UE 1712 towards the host computer 1716.

Example implementations, in accordance with an embodiment, of the UE, base station, and host computer discussed in the preceding paragraphs will now be described with reference to FIG. 18. In a communication system 1800, a host computer 1802 comprises hardware 1804 including a communication interface 1806 configured to set up and maintain a wired or wireless connection with an interface of a different communication device of the communication system 1800. The host computer 1802 further comprises processing circuitry 1808, which may have storage and/or processing capabilities. In particular, the processing circuitry 1808 may comprise one or more programmable processors, ASICs, FPGAs, or combinations of these (not shown) adapted to execute instructions. The host computer 1802 further comprises software 1810, which is stored in or accessible by the host computer 1802 and executable by the processing circuitry 1808. The software 1810 includes a host application 1812. The host application 1812 may be operable to provide a service to a remote user, such as a UE 1814 connecting via an OTT connection 1816 terminating at the UE 1814 and the host computer 1802. In providing the service to the remote user, the host application 1812 may provide user data which is transmitted using the OTT connection 1816.

The communication system 1800 further includes a base station 1818 provided in a telecommunication system and comprising hardware 1820 enabling it to communicate with the host computer 1802 and with the UE 1814. The hardware 1820 may include a communication interface 1822 for setting up and maintaining a wired or wireless connection with an interface of a different communication device of the communication system 1800, as well as a radio interface 1824 for setting up and maintaining at least a wireless connection 1826 with the UE 1814 located in a coverage area (not shown in FIG. 18) served by the base station 1818. The communication interface 1822 may be configured to facilitate a connection 1828 to the host computer 1802. The connection 1828 may be direct or it may pass through a core network (not shown in FIG. 18) of the telecommunication system and/or through one or more intermediate networks outside the telecommunication system. In the embodiment shown, the hardware 1820 of the base station 1818 further includes processing circuitry 1830, which may comprise one or more programmable processors, ASICs, FPGAs, or combinations of these (not shown) adapted to execute instructions. The base station 1818 further has software 1832 stored internally or accessible via an external connection.

The communication system 1800 further includes the UE 1814 already referred to. The UE's 1814 hardware 1834 may include a radio interface 1836 configured to set up and maintain a wireless connection 1826 with a base station serving a coverage area in which the UE 1814 is currently located. The hardware 1834 of the UE 1814 further includes processing circuitry 1838, which may comprise one or more programmable processors, ASICs, FPGAs, or combinations of these (not shown) adapted to execute instructions. The UE 1814 further comprises software 1840, which is stored in or accessible by the UE 1814 and executable by the processing circuitry 1838. The software 1840 includes a client application 1842. The client application 1842 may be operable to provide a service to a human or non-human user via the UE 1814, with the support of the host computer 1802. In the host computer 1802, the executing host application 1812 may communicate with the executing client application 1842 via the OTT connection 1816 terminating at the UE 1814 and the host computer 1802. In providing the service to the user, the client application 1842 may receive request data from the host application 1812 and provide user data in response to the request data. The OTT connection 1816 may transfer both the request data and the user data. The client application 1842 may interact with the user to generate the user data that it provides.

Figure 18:
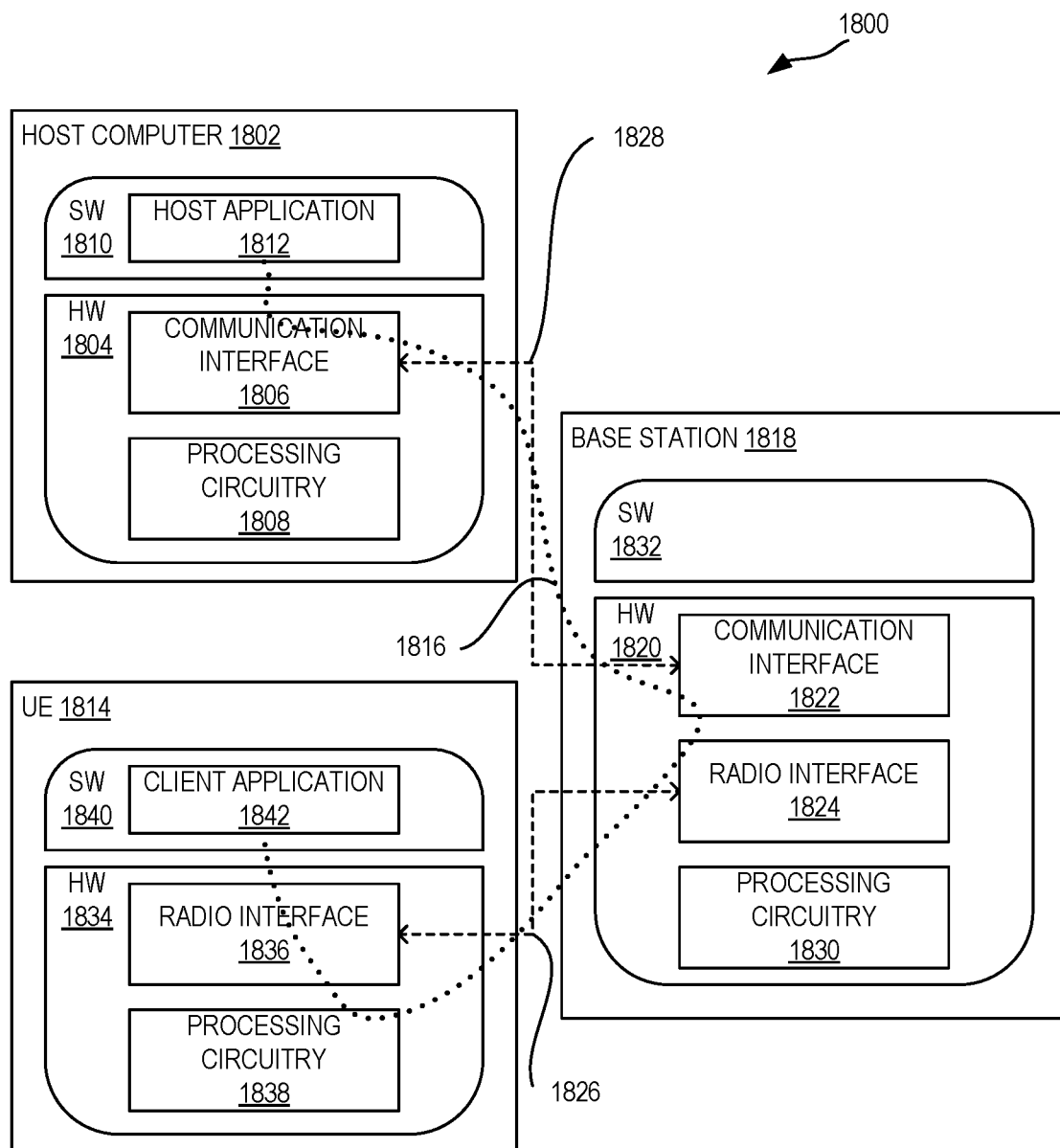
FIG. 18 is a schematic block diagram of a UE, a base station, and a host computer according to some other embodiments of the present disclosure.

It is noted that the host computer 1802, the base station 1818, and the UE 1814 illustrated in FIG. 18 may be similar or identical to the host computer 1716, one of the base stations 1706A, 1706B, 1706C, and one of the UEs 1712, 1714 of FIG. 17, respectively. This is to say, the inner workings of these entities may be as shown in FIG. 18 and independently, the surrounding network topology may be that of FIG. 17.

In FIG. 18, the OTT connection 1816 has been drawn abstractly to illustrate the communication between the host computer 1802 and the UE 1814 via the base station 1818 without explicit reference to any intermediary devices and the precise routing of messages via these devices. The network infrastructure may determine the routing, which may be configured to hide from the UE 1814 or from the service provider operating the host computer 1802, or both. While the OTT connection 1816 is active, the network infrastructure may further take decisions by which it dynamically changes the routing (e.g., on the basis of load balancing consideration or reconfiguration of the network).

The wireless connection 1826 between the UE 1814 and the base station 1818 is in accordance with the teachings of the embodiments described throughout this disclosure. One or more of the various embodiments improve the performance of OTT services provided to the UE 1814 using the OTT connection 1816, in which the wireless connection 1826 forms the last segment. A measurement procedure may be provided for the purpose of monitoring data rate, latency, and other factors on which the one or more embodiments improve. There may further be an optional network functionality for reconfiguring the OTT connection 1816 between the host computer 1802 and the UE 1814, in response to variations in the measurement results. The measurement procedure and/or the network functionality for reconfiguring the OTT connection 1816 may be implemented in the software 1810 and the hardware 1804 of the host computer 1802 or in the software 1840 and the hardware 1834 of the UE 1814, or both. In some embodiments, sensors (not shown) may be deployed in or in association with communication devices through which the OTT connection 1816 passes; the sensors may participate in the measurement procedure by supplying values of the monitored quantities exemplified above, or supplying values of other physical quantities from which the software 1810, 1840 may compute or estimate the monitored quantities. The reconfiguring of the OTT connection 1816 may include message format, retransmission settings, preferred routing, etc.; the reconfiguring need not affect the base station 1818, and it may be unknown or imperceptible to the base station 1818. Such procedures and functionalities may be known and practiced in the art. In certain embodiments, measurements may involve proprietary UE signaling facilitating the host computer 1802's measurements of throughput, propagation times, latency, and the like. The measurements may be implemented in that the software 1810 and 1840 causes messages to be transmitted, in particular empty or 'dummy' messages, using the OTT connection 1816 while it monitors propagation times, errors, etc.

Figures 19, 20:
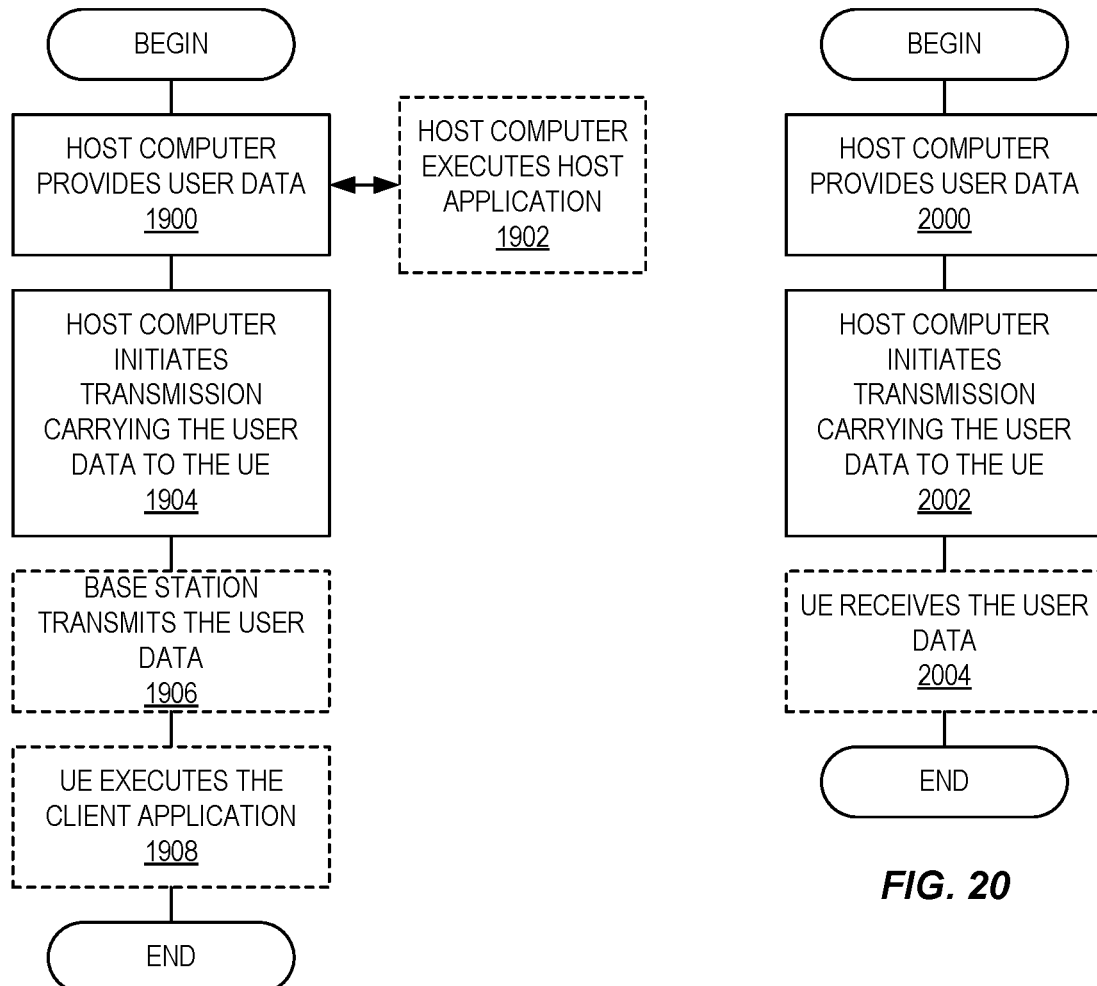
FIG. 19 is a flowchart illustrating a method implemented in a communication system in accordance with one embodiment of the present disclosure.
FIG. 20 is a flowchart illustrating a method implemented in a communication system in accordance with one embodiment of the present disclosure.

FIG. 19 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 19 will be included in this section. In step 1900, the host computer provides user data. In sub-step 1902 (which may be optional) of step 1900, the host computer provides the user data by executing a host application. In step 1904, the host computer initiates a transmission carrying the user data to the UE. In step 1906 (which may be optional), the base station transmits to the UE the user data which was carried in the transmission that the host computer initiated, in accordance with the teachings of the embodiments described throughout this disclosure. In step 1908 (which may also be optional), the UE executes a client application associated with the host application executed by the host computer.

FIG. 20 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 20 will be included in this section. In step 2000 of the method, the host computer provides user data. In an optional sub-step (not shown) the host computer provides the user data by executing a host application. In step 2002, the host computer initiates a transmission carrying the user data to the UE. The transmission may pass via the base station, in accordance with the teachings of the embodiments described throughout this disclosure. In step 2004 (which may be optional), the UE receives the user data carried in the transmission.

FIG. 21 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 21 will be included in this section. In step 2100 (which may be optional), the UE receives input data provided by the host computer. Additionally or alternatively, in step 2102, the UE provides user data. In sub-step 2104 (which may be optional) of step 2100, the UE provides the user data by executing a client application. In sub-step 2106 (which may be optional) of step 2102, the UE executes a client application which provides the user data in reaction to the received input data provided by the host computer. In providing the user data, the executed client application may further consider user input received from the user. Regardless of the specific manner in which the user data was provided, the UE initiates, in sub-step 2108 (which may be optional), transmission of the user data to the host computer. In step 2110 of the method, the host computer receives the user data transmitted from the UE, in accordance with the teachings of the embodiments described throughout this disclosure.

FIG. 22 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 22 will be included in this section. In step 2200 (which may be optional), in accordance with the teachings of the embodiments described throughout this disclosure, the base station receives user data from the UE. In step 2202 (which may be optional), the base station initiates transmission of the received user data to the host computer. In step 2204 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Group A Embodiments

Embodiment 1

A method performed by a wireless device for improving non-overlapping time domain resource allocation (TDRA) signalling (e.g., as defined in NR Rel. 15 and/or Rel. 16) in multi-TRP (transmission point) operation, the method comprising one or more of: receiving (XX800) a downlink control information (DCI) message comprising a TDRA field, the TDRA field comprising a scheduling for receiving multiple mini-slots (e.g., multiple repetitions) from multiple TRPs, respectively, wherein each of the multiple mini-slots corresponds to a different start position (e.g., start symbol); and receiving (XX802) the multiple mini-slots from the multiple TRPs based on the scheduling received in the TDRA field of the DCI message.

Embodiment 2

The method of embodiment 1, wherein each of the multiple mini-slots corresponds to a different time duration/length.

Embodiment 3

The method of any of the previous embodiments, wherein the scheduling information comprised in the TDRA field comprises a joint encoding indicating a relationship between an end position (e.g., symbol) of a selected mini-slot among the multiple mini-slots and a start position (e.g., symbol) of a succeeding mini-slot among the multiple mini-slots.

Embodiment 4

The method any of the previous embodiments, wherein the scheduling information comprised in the TDRA field comprises one or more of: an indication of a start position (e.g., symbol) of a first mini-slot (e.g., first repetition); and an indication of a respective length/duration (e.g., number of symbols) of each of the multiple mini-slots (e.g., each of the multiple repetitions).

Embodiment 5

The method of any of the previous embodiments, wherein the DCI message further comprises a TCI field, and an indication in the TCI field indicates a repetition cycle through multiple TCI states corresponding to the multiple TRPs, respectively.

Embodiment 6

The method of any of the previous embodiments, further comprising receiving multiple TDRAs from the multiple TRPs in different slots.

Embodiment 7

The method of any of the previous embodiments, further comprising one or more of: receiving even numbered mini-slots (e.g., repetitions) from a first of the multiple TRPs; and receiving odd numbered mini-slots (e.g., repetitions) from a second of the multiple TRPs.

Embodiment 8

The method of any of the previous embodiments, further comprising one or more of: providing user data; and forwarding the user data to a host computer via the transmission to the base station.

Embodiment 9

The method of any of the previous embodiments, further comprising the step of receiving a respective TDRA field for enabling uplink multi-TRP operation.

Embodiment 10

A method in a User Equipment, UE, for receiving (XX900) an indication of multiple PDSCH scheduling (repetitions) by a single downlink control information (DCI) message, comprising multiple non-overlapping time domain resource allocations wherein the UE receives information of a start symbol and a length of each repetition.
  a. The number of repetitions may be either signaled explicitly
  b. The number of repetitions may be implicitly derived by the UE based on the starting symbol and the length
  c. The length of the last repetition may be the same or different from the signaled length
Each repetition is associated with a TCI state (i.e., TRP) according to the TCI state order indicated in the TCI field starting from the $1^{st}$ TCI state corresponding to the $1^{st}$ repetition.

Embodiment 1

The method according to embodiment 10, where information carried in the TCI state field in the same DCI message provides additional and required information to determine the PDSCH time resource allocation for each of the multiple, scheduled, PDSCH repetitions.

Group B Embodiments

Embodiment 12

A method performed by a base station for improving non-overlapping time domain resource allocation (TDRA) signalling (e.g., as defined in NR Rel. 15 and/or Rel. 16) in multi-TRP (transmission point) operation, the method comprising one or more of: transmitting (XX1000) a downlink control information (DCI) message comprising a TDRA field, the TDRA field comprising a scheduling for transmitting multiple mini-slots (e.g., multiple repetitions) from multiple TRPs, respectively, wherein each of the multiple mini-slots corresponds to a different start position (e.g., start symbol); and transmitting (XX1002) the multiple mini-slots from the multiple TRPs based on the scheduling transmitted in the TDRA field of the DCI message.

Embodiment 13

The method of embodiment 12, further comprising the step of transmitting the scheduling for transmitting multiple mini-slots from multiple TRPs, respectively, wherein each of the multiple mini-slots corresponds to a different time duration/length.

Embodiment 14

The method of any of the previous embodiments, wherein the scheduling information comprised in the TDRA field comprises a joint encoding indicating a relationship between an end position (e.g., symbol) of a selected mini-slot among the multiple mini-slots and a start position (e.g., symbol) of a succeeding mini-slot among the multiple mini-slots.

Embodiment 15

The method of any of the previous embodiments, wherein the scheduling information comprised in the TDRA field comprises one or more of: an indication of a start position (e.g., symbol) of a first mini-slot (e.g., first repetition); and an indication of a respective length/duration (e.g., number of symbols) of each of the multiple mini-slots (e.g., each of the multiple repetitions).

Embodiment 16

The method of any of the previous embodiments, wherein the DCI message further comprises a TCI field, and an indication in the TCI field of the DCI that indicates a repetition cycle through multiple TCI states corresponding to the multiple TRPs, respectively.

Embodiment 17

The method of any of the previous embodiments, further comprising the step of transmitting a respective TDRA field for enabling uplink multi-TRP operation.

Embodiment 18

The method of any of the previous embodiments, further comprising one or more of: transmitting even numbered mini-slots (e.g., repetitions) from a first of the multiple TRPs; and transmitting odd numbered mini-slots (e.g., repetitions) from a second of the multiple TRPs.

Embodiment 19

The method of any of the previous embodiments, further comprising one or more of: obtaining user data; and forwarding the user data to a host computer or a wireless device.

Group C Embodiments

Embodiment 20

A wireless device for improving non-overlapping time domain resource allocation (TDRA) signalling (e.g., as defined in NR Rel. 15 and/or Rel. 16) in multi-TRP (transmission point) operation, the wireless device comprising: processing circuitry configured to perform any of the steps of any of the Group A embodiments; and power supply circuitry configured to supply power to the wireless device.

Embodiment 21

A base station for improving non-overlapping time domain resource allocation (TDRA) signalling (e.g., as defined in NR Rel. 15 and/or Rel. 16) in multi-TRP (transmission point) operation, the base station comprising: processing circuitry configured to perform any of the steps of any of the Group B embodiments; and power supply circuitry configured to supply power to the base station.

Embodiment 22

A User Equipment, UE, for improving non-overlapping time domain resource allocation (TDRA) signalling (e.g., as defined in NR Rel. 15 and/or Rel. 16) in multi-TRP (transmission point) operation, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 23

A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 24

The communication system of the previous embodiment further including the base station.

Embodiment 25

The communication system of the previous 2 embodiments, further including the UE, wherein the UE is configured to communicate with the base station.

Embodiment 26

The communication system of the previous 3 embodiments, wherein: the processing circuitry of the host computer is configured to execute a host application, thereby providing the user data; and the UE comprises processing circuitry configured to execute a client application associated with the host application.

Embodiment 27

A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 28

The method of the previous embodiment, further comprising, at the base station, transmitting the user data.

Embodiment 29

The method of the previous 2 embodiments, wherein the user data is provided at the host computer by executing a host application, the method further comprising, at the UE, executing a client application associated with the host application.

Embodiment 30

A User Equipment, UE, configured to communicate with a base station, the UE comprising a radio interface and processing circuitry configured to perform the method of the previous 3 embodiments.

Embodiment 31

A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 32

The communication system of the previous embodiment, wherein the cellular network further includes a base station configured to communicate with the UE.

Embodiment 33

The communication system of the previous 2 embodiments, wherein: the processing circuitry of the host computer is configured to execute a host application, thereby providing the user data; and the UE's processing circuitry is configured to execute a client application associated with the host application.

Embodiment 34

A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 35

The method of the previous embodiment, further comprising at the UE, receiving the user data from the base station.

Embodiment 36

A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 37

The communication system of the previous embodiment, further including the UE.

Embodiment 38

The communication system of the previous 2 embodiments, further including the base station, wherein the base station comprises a radio interface configured to communicate with the UE and a communication interface configured to forward to the host computer the user data carried by a transmission from the UE to the base station.

Embodiment 39

The communication system of the previous 3 embodiments, wherein: the processing circuitry of the host computer is configured to execute a host application; and the UE's processing circuitry is configured to execute a client application associated with the host application, thereby providing the user data.

Embodiment 40

The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 41

A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 42

The method of the previous embodiment, further comprising, at the UE, providing the user data to the base station.

Embodiment 43

The method of the previous 2 embodiments, further comprising: at the UE, executing a client application, thereby providing the user data to be transmitted; and at the host computer, executing a host application associated with the client application.

Embodiment 44

The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 45

A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 46

The communication system of the previous embodiment further including the base station.

Embodiment 47

The communication system of the previous 2 embodiments, further including the UE, wherein the UE is configured to communicate with the base station.

Embodiment 48

The communication system of the previous 3 embodiments, wherein: the processing circuitry of the host computer is configured to execute a host application; and the UE is configured to execute a client application associated with the host application, thereby providing the user data to be received by the host computer.

Embodiment 49

A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 50

The method of the previous embodiment, further comprising at the base station, receiving the user data from the UE.

Embodiment 51

The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AMF Access and Mobility Function
AN Access Network
AP Access Point
ASIC Application Specific Integrated Circuit
AUSF Authentication Server Function
CDM Code Division Multiplexing
CP Cyclic Prefix
CPU Central Processing Unit
CSI Channel State Information
CSI-RS Channel State Information Reference Signal
DCI Downlink Control Information
DFT Discrete Fourier Transform
DFT-S-OFDM Discrete Fourier Transform Spread Orthogonal Frequency Division Multiplexing
DL Downlink
DMRS Demodulation Reference Signal
DSP Digital Signal Processor
eNB Enhanced or Evolved Node B
FPGA Field Programmable Gate Array
gNB New Radio Base Station
HSS Home Subscriber Server
IE Information Element
LTE Long Term Evolution
MCS Modulation and Coding Scheme
MME Mobility Management Entity
MTC Machine Type Communication
MU-MIMO Multiple User Multiple Input Multiple Output
NEF Network Exposure Function
NF Network Function
NR New Radio
NRF Network Function Repository Function
NSSF Network Slice Selection Function
OCC Orthogonal Cover Code
OFDM Orthogonal Frequency Division Multiplexing
OTT Over-the-Top
PCF Policy Control Function
PDC Physical Data Channel
PDCCH Physical Downlink Control Channel
P-GW Packet Data Network Gateway
PDSCH Physical Downlink Shared Channel
PUSCH Physical Uplink Shared Channel
QCL Quasi Co-Located
RAM Random Access Memory
RAN Radio Access Network
RB Resource Block
RE Resource Element
ROM Read Only Memory
RRC Radio Resource Control
RRH Remote Radio Head
RS Reference Signal
RV Redundancy Version
SCEF Service Capability Exposure Function
SCS Smaller Subcarrier Spacing
SINR Signal to Interference plus Noise Ratio
SLIV Start and Length Indicator Value
SMF Session Management Function
SPS Semi-Persistent Scheduling
TB Transport Block
TCI Transmission Configuration Indication
TDRA Time Domain Resource Allocation
TRP Transmission/Reception Points
TRS Tracking Reference Signal
UDM Unified Data Management
UE User Equipment
UL Uplink
UPF User Plane Function
URLLC Ultra-Reliable and Low Latency Communication Those skilled in the art will recognize improvements and modifications to the embodiments of the present disclosure. All such improvements and modifications are considered within the scope of the concepts disclosed herein.

What is claimed is:

1. A method performed by a wireless device for receiving a Transport Block, TB, over multiple transmission occasions, comprising:
   receiving a Time Domain Resource Allocation, TDRA, from a network node in a TDRA field of a Downlink Control Information, DCI, message, the TDRA indicating reception of a plurality of transmission occasions of a same or different redundancy versions of the TB in a plurality of non-overlapping transmission occasions corresponding to a plurality of Transmission Configuration Indication, TCI, states and having a plurality of different start positions, respectively;

wherein the number of the plurality of the non-overlapping transmission occasions is explicitly indicated via the TDRA received in the TDRA field; and receiving the plurality of transmission occasions corresponding to the plurality of TCI states in the plurality of non-overlapping transmission occasions.

2. The method of claim 1, wherein each of the plurality of non-overlapping transmission occasions corresponds to an identical length or duration.

3. The method of claim 1, further comprising receiving a TCI field in the DCI message, the TCI field indicating the plurality of TCI states.

4. The method of claim 3, wherein the number of transmission occasions and the time-domain resource allocation for each transmission occasion are jointly encoded and are indicated by a codepoint of the TDRA field in DCI.

5. The method of claim 3, wherein the plurality of TCI states indicated in the TCI field are cycled through the indicated number of transmission occasions, wherein a transmission occasion among the plurality of transmission occasions is associated to a TCI state among the plurality of TCI states according to an order of plurality of TCI states indicated in the TCI field.

6. The method of claim 3, wherein a first TCI state indicated in the TCI field among the plurality of TCI states is associated to a first transmission occasion among the plurality of transmission occasions.

7. The method of claim 3, wherein when a single TCI state is indicated in the TCI field, the single TCI state is associated to all the indicated number of the plurality of transmission occasions.

8. The method of claim 3, wherein the plurality of TCI states indicated in the TCI field comprises a first TCI state and a second TCI state.

9. The method of claim 3, wherein an even numbered transmission occasion among the plurality of transmission occasions is associated with the first indicated TCI state and an odd numbered transmission occasion among the plurality of transmission occasions is associated with the second indicated TCI state.

10. The method of claim 9, wherein the length of the even numbered transmission occasion is defined by the length of the odd numbered transmission occasion.

11. The method of claim 9, wherein a 'PDSCH Type B' indicated via the TDRA field in DCI message is applied to the odd numbered transmission occasion and the even numbered transmission occasion among the plurality of transmission occasions.

12. The method of claim 3, wherein the indicated plurality of TCI states correspond to a plurality of Transmission/Reception points (TRPs).

13. The method of claim 12, further comprising receiving the TDRA from the network node for transmission of a plurality of uplink transmission occasions of a same or different redundancy versions of an uplink TB from the wireless device to the plurality of TRPs.

14. The method of claim 1, wherein the time-domain resource allocation consists of a start symbol and a length given by the parameter 'startSymbolAndLength'.

15. A method performed by a wireless device for receiving a Transport Block, TB, over multiple transmission occasions, comprising:

receiving a Time Domain Resource Allocation, TDRA, from a network node, in a TDRA field of a Downlink Control Information, DCI, message, for a plurality of transmission occasions of a same or different redundancy versions of the TB in a plurality of non-overlapping transmission occasions corresponding to a plurality of Transmission Configuration Indication, TCI, states and having a plurality of different start positions, respectively;

wherein only a start symbol and a length of the odd numbered transmission occasion among the plurality of transmission occasions are indicated in the TDRA indicated by a codepoint of the TDRA field in the DCI message, and wherein a start symbol of the even numbered transmission occasion among the plurality of transmission occasions is determined with respect to a last symbol of an immediately preceding odd numbered transmission occasion among the plurality of transmission occasions; and receiving the plurality of transmission occasions corresponding to the plurality of TCI states in the plurality of non-overlapping transmission occasions.

16. The method of claim 15, wherein each of the plurality of non-overlapping transmission occasions corresponds to an identical length or duration.

17. The method of claim 15, further comprising receiving a TCI field in the DCI message, the TCI field indicating the plurality of TCI states.

18. The method of claim 17, wherein a number of the plurality of transmission occasions is indicated via a number of the plurality of TCI states indicated in the TCI field.

19. The method of claim 17, wherein the plurality of TCI states indicated in the TCI field comprises a first TCI state and a second TCI state.

20. The method of claim 17, wherein the plurality of TCI states indicated in the TCI field are cycled through the indicated number of transmission occasions, wherein a transmission occasion among the plurality of transmission occasions is associated to a TCI state among the plurality of TCI states according to an order of plurality of TCI states indicated in the TCI field.

21. The method of claim 17, wherein a first TCI state indicated in the TCI field among the plurality of TCI states is associated to a first transmission occasion among the plurality of transmission occasions.

22. The method of claim 17, wherein an even numbered transmission occasion among the plurality of transmission occasions is associated with the first indicated TCI state and an odd numbered transmission occasion among the plurality of transmission occasions is associated with the second indicated TCI state.

23. The method of claim 22, wherein a start symbol of the even numbered transmission occasion among the plurality of transmission occasions is determined by adding one (1) to a last symbol of the immediately preceding odd numbered transmission occasion among the plurality of transmission occasions.

24. The method of claim 22, wherein the length of the even numbered transmission occasion is defined by the length of the odd numbered transmission occasion.

25. The method of claim 17, wherein a 'PDSCH Type B' indicated via the TDRA field in DCI message is applied to the odd numbered transmission occasion and the even numbered transmission occasion among the plurality of transmission occasions.

26. The method of claim 15, wherein the time-domain resource allocation consists of a start symbol and a length given by the parameter 'startSymbolAndLength'.

* * * * *